United States Patent
Leong

(10) Patent No.: US 10,372,888 B2
(45) Date of Patent: Aug. 6, 2019

(54) PERIPHERAL MODE FOR CONVERTIBLE LAPTOPS

(71) Applicant: Google Inc., Mountain View, CA (US)

(72) Inventor: Jian Wei Leong, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 285 days.

(21) Appl. No.: 15/379,051

(22) Filed: Dec. 14, 2016

(65) Prior Publication Data
US 2018/0165429 A1    Jun. 14, 2018

(51) Int. Cl.
G06F 21/31    (2013.01)
G06F 3/0346    (2013.01)
G06F 1/16    (2006.01)

(52) U.S. Cl.
CPC ............ G06F 21/31 (2013.01); G06F 1/1618 (2013.01); G06F 1/1677 (2013.01); G06F 3/0346 (2013.01)

(58) Field of Classification Search
CPC ...... G06F 21/31; G06F 1/1677; G06F 1/1618; G06F 3/0346
USPC .......................................................... 726/18
See application file for complete search history.

(56) References Cited

U.S. PATENT DOCUMENTS 5,410,305 A    4/1995    Barrus et al.
6,480,587 B1    11/2002    Rao et al.
2006/0203014 A1    9/2006    Lev et al.
2010/0039764 A1    2/2010    Locker et al.
2010/0321275 A1    12/2010    Hinckley et al.
2011/0015894 A1*    1/2011    Chu ...................... G06F 1/1677
                                                                    702/151
2013/0014232 A1*    1/2013    Louboutin ........ H04M 1/72527
                                                                    726/5

(Continued)

FOREIGN PATENT DOCUMENTS

JP    2016200898 A    12/2016
WO    2013160525 A1    10/2013

OTHER PUBLICATIONS

"1Keyboard", retrieved on Jul. 21, 2016 from http://www.eyalw.com/1keyboard, 2014, 4 pages.

(Continued)

*Primary Examiner* — Teshome Hailu
(74) *Attorney, Agent, or Firm* — Brake Hughes Bellermann LLP

(57) ABSTRACT

In one general aspect, a method can include determining that a computing device is in a peripheral mode of operation based on an orientation of a lid portion with respect to a base portion, the orientation allowing access to one or more input devices included in an input area included in the base portion. The method further includes entering a broadcast discovery mode when the computing device is in the peripheral mode of operation, connecting the computing device to a display system listening for broadcasts, sending, to the display system, network credentials and user credentials associated with the computing device, receiving, by the computing device and from a computer system, a request to confirm the connection between the computing device and the display system, and providing, by the computing device, to the computer system, confirmation of the connection between the computing device and the display system.

20 Claims, 13 Drawing Sheets

(56) References Cited

U.S. PATENT DOCUMENTS

| | | | |
|---|---|---|---|
| 2013/0215008 A1 | 8/2013 | Hung | |
| 2013/0271378 A1 | 10/2013 | Hulford | |
| 2014/0089711 A1* | 3/2014 | Balasundaram | G11C 5/14 713/323 |
| 2014/0215248 A1* | 7/2014 | Cheng | G06F 1/3231 713/323 |
| 2014/0223516 A1* | 8/2014 | Vongsouvanh | H04L 63/0492 726/4 |
| 2015/0019163 A1 | 1/2015 | Needham | |
| 2017/0235355 A1* | 8/2017 | Alshinnawi | G06F 1/3206 713/323 |

OTHER PUBLICATIONS

"A candy-bar-sized Chrome OS device that turns any HDMI monitor or TV in to computer", Chromebit (CS10), retrieved on Jul. 20, 2016 from https://www.asus.com/us/ChromeDevices/ChromebitCS10/, 9 pages.

"AlphaSmart", From Wikipedia, the free encyclopedia, retrieved on Jul. 21, 2016 from https://en.wikipedia.org/wiki/AlphaSmart, May 10, 2016, 4 pages.

"Developers Tip: Detecting Orientation and Usage Mode", UMPC Portal, retrieved on Jul. 21, 2016 from http://www.umpcportal.com/2013/03/developerstipdetectingorientationandusagemode/, Mar. 18, 2013, 4 pages.

"Review: Use your Mac as bluetooth iPad keyboard", TinnedSoftware Blog, retrieved on Jul. 21, 2016 from https://blog.tinnedsoftware.net/reviewuseyourmacasbluetoothipadkeyboard/, Jul. 25, 2013, 4 pages.

"Use Mac keyboard for iPhone, iPad, Apple TV or Android devices", retrieved on Jul. 21, 2016 from http://mac.eltima.com/bluetoothkeyboard.html, 5 pages.

Casserly, "How to use Continuum in Windows 10 to switch between desktop and tablet mode automatically", retrieved on Jul. 21, 2016 from http://www.pcadvisor.co.uk/howto/windows/howusenewcontinuumfeatureinwindows103618849/, Jul. 7, 2015, 4 pages.

Dawson, "Sponsored App Review: iKeyboard—Emoji", retrieved on Jul. 21, 2016 from http://www.androidheadlines.com/2014/08/sponsoredappreviewikeyboardemoji.html, Aug. 21, 2014, 19 pages.

Kim, "Mouse / Touch Mode Detection on Windows® 10 and Windows* 8", Intel® Software, retrieved on Jul. 21, 2016 from https://software.intel.com/enus/articles/detectingslateclamshellmodescreenorientationinconvertiblepc, Sep. 1, 2015, 4 pages.

Wroblewski, "Device Motion in Application Design", retrieved on Jul. 21, 2016 from http://www.lukew.com/ff/entry.asp?1722, May 14, 2013, 7 pages.

International Search Report and Written Opinion for International Application PCT/US2017/052691, dated Apr. 6, 2018, 26 pages.

* cited by examiner

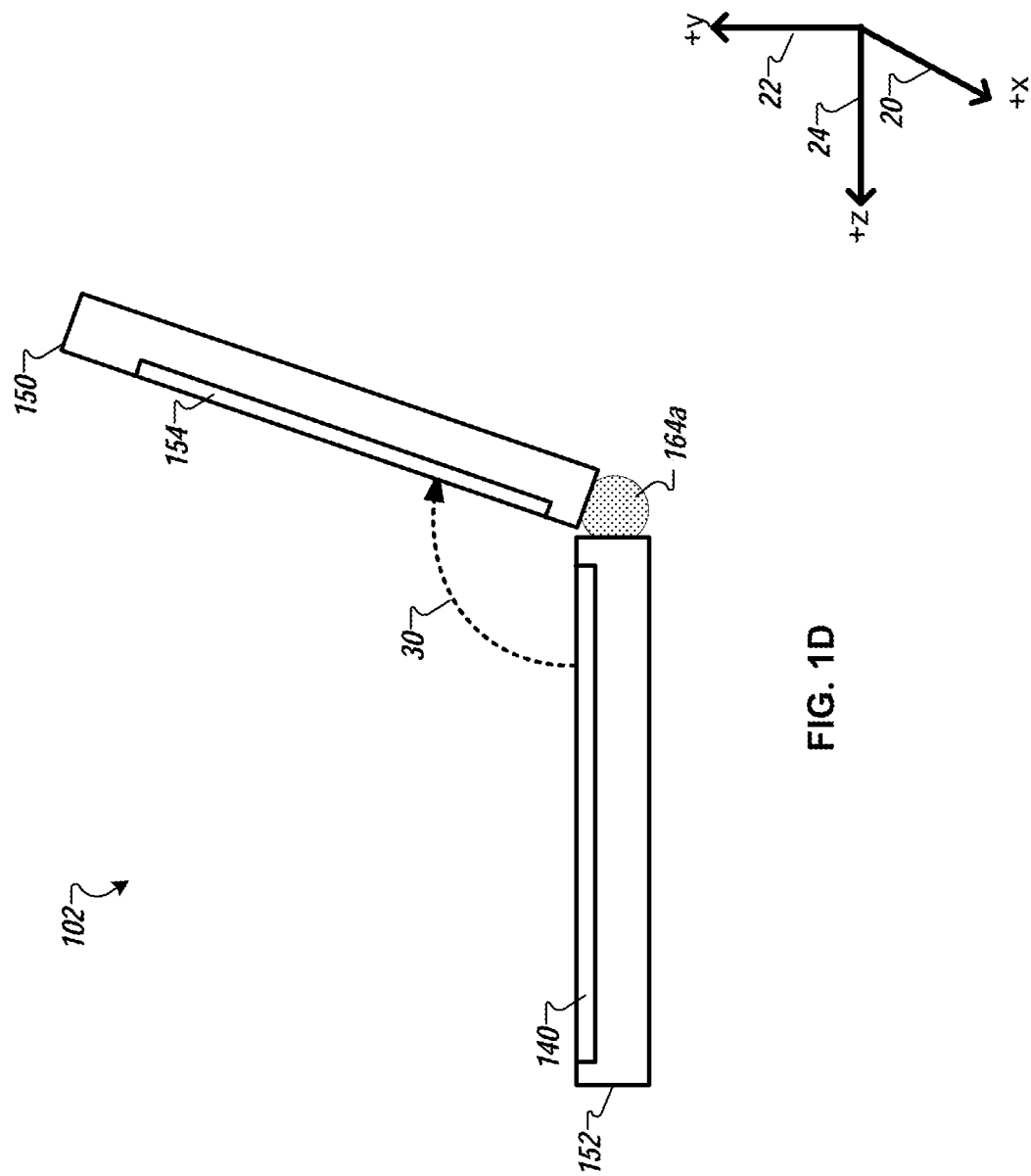

PERIPHERAL MODE FOR CONVERTIBLE LAPTOPS

TECHNICAL FIELD

This description generally relates to computing devices. The description, in particular, relates the use of convertible laptop computing devices.

BACKGROUND

Computing devices can provide a user with multiple ways to control the operations of, and to input data to, a computing device. A computing device can include, for example, a touchscreen display, a keyboard, a mouse, a trackpad, a touchpad, a pointing stick, one or more mouse buttons, a trackball, a joystick, and other types of input devices. A user of the computing device can interact with one or more of these input devices when providing input to and/or otherwise controlling the operation of an application running on the computing device.

In some implementations, a computing device can include a lid and a base. For example, one or more input devices can be included in the base of the computing device. A display device (e.g., a touchscreen display) can be included in the lid of the computing device. In some implementations, the lid of the computing device may be rotated to multiple positions with respect to the base of the computing device allowing the computing device to function in multiple different modes of operation dependent on the placement of the lid with respect to the base of the computing device.

SUMMARY

According to one general aspect, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method can include determining, by a computing device including a lid portion and a base portion mechanically coupled to the lid portion, that the computing device is in a peripheral mode of operation based on an orientation of the lid portion with respect to the base portion, the orientation allowing access to one or more input devices included in an input area included in the base portion, entering, by the computing device, a broadcast discovery mode when the computing device is in the peripheral mode of operation, connecting the computing device to a display system listening for broadcasts, the connecting enabling wireless communication between the computing device and the display system, sending, to the display system, network credentials and user credentials associated with the computing device, receiving, by the computing device, from a computer system, a request to confirm the connection between the computing device and the display system, and providing, by the computing device, to the computer system, confirmation of the connection between the computing device and the display system.

Example implementations may include one or more of the following features. For instance, determining that the computing device is in a peripheral mode of operation can include determining that the computing device is in a fully open position, and determining that the base portion of the computing device is placed face-up allowing the access to the one or more input devices included in the input area of the base portion. Connecting the computing device to the display system can further include receiving confirmation to allow the connecting of the computing device to the display system, and providing the confirmation to the display system. Receiving the confirmation to allow the connecting of the computing device to the display system can include entering, by a user of the computing device, an identifier into a graphical user interface displayed in a display area of a display device included in the display system. The entering can include receiving data indicative of interactions with the one or more input devices included in the input area of the base portion, and providing, by the computing device and to the display system, the received data indicative of interactions with the one or more input devices to the display system. The display system can include control circuitry and software configured to implement communication between the display system and the computing device in the peripheral mode of operation, implement communication between the display system and a computer system by way of a network, and process information and data received from the computing device. Processing the information and data received from the computing device can include controlling content on the display system based on the information and data received from the computing device. The display system can further include a display device. The control circuitry and software can be included in a dongle plugged into the display device. The method can further include establishing, based on the network credentials, a connection between the display system and a network, and providing to the display system access to an account of a user based on the user credentials. The method can further include receiving, from the display system, an identifier for the display system. The request received from the computer system to confirm the connection between the computing device and the display system can include the display system identifier. Providing confirmation of the connection between the computing device and the display system can include determining that the display system identifier received from the computer system is the same as the display system identifier received from the display system.

In another general aspect, a method can include establishing, by a display system, a connection to a computing device based on determining that the computing device is within a short-range communication range of the display system and based on receiving confirmation for the connection from the computing device, receiving, by the display system from the computing device, network credentials and user credentials associated with the computing device, establishing, by the display system, a connection to a network using the network credentials, sending, by the display system and to a computer system by way of the network, the user credentials, requesting approval for access to a user account using the user credentials, accessing the user account, the accessing based on receiving approval to access to the user account, accessing one or more services based on accessing the user account, receiving, from the computing device, input control data, and accessing, by the display system, content provided by the one or more services based on the received input control data, the content for use by the display system.

Example implementations may include one or more of the following features. For instance, the method can further include receiving, from the computing device, a computing device identifier associated with the computing device.

Requesting approval for access to the user account using the user credentials can include sending the computing device identifier to the computer system for use in identifying the computing device. Requesting approval for access to the user account using the user credentials can further include sending an identifier associated with the display system to the computer system for use by the computing device when determining the approval for the display system to access the user account. Receiving confirmation for the connection from the computing device can include displaying, on a display device included in the display system, a graphical user interface (GUI) including a numerical code, and receiving entry of the numerical code in the GUI.

In yet another general aspect, a computing device can include a lid portion, a base portion mechanically coupled to the lid portion, the base portion including an input area, the input area including at least one input device, a processor configured to process instructions for execution within the computing device, a memory configured to store an identifier associated with the computing device, at least one sensor configured to sense a configuration of the computing device, an operating mode manager configured to enter the computing device into a peripheral mode of operation based on receiving data from the at least one sensor indicating that the computing device is in a fully open configuration allowing access to the at least one input device included in the input area included in the base portion, and at least one communication module configured to initiate a broadcast discovery mode when the computing device is in the peripheral mode of operation, connect to a display system listening for broadcasts, the connecting enabling wireless communications between the computing device and the display system, send, to the display system, network credentials and user credentials associated with the computing device, and provide, to the display system, data for use in confirming the connection between the computing device and the display system.

Example implementations may include one or more of the following features. For instance, the operating mode manager can be further configured to receive data indicative of an interaction with the at least one input device. The data indicative of the interaction with the at least one input device can be used to confirm the connection between the computing device and the display system. Entering the computing device into a peripheral mode of operation can be further based on receiving data from the at least one sensor indicating that the base portion of the computing device is placed face-up allowing the access to the at least one input device included in the input area of the base portion. The display system can use the network credentials to connect to a network. the display system can use the user credentials to access an account of a user. The computing device can further include another communication module configured to receive, from a computer system, an identifier for the display system. The at least one communication module can be further configured to receive, from the display system, the display system identifier. Providing data for use in confirming the connection between the computing device and the display system can be based on determining that the display system identifier received from the computer system is the same as the display system identifier received from the display system. The at least one communication module can be configured for Bluetooth communication and the other configuration module can be configured for WiFi communication.

The details of one or more implementations are set forth in the accompanying drawings and the description below. Other features will be apparent from the description and drawings, and from the claims.

BRIEF DESCRIPTION OF THE DRAWINGS

FIG. 1D is a diagram that illustrates a side-view of an example computing device in a first position (e.g., an open position, a laptop configuration).

Like reference symbols in the various drawings indicate like elements.

DETAILED DESCRIPTION

Figure 1A:
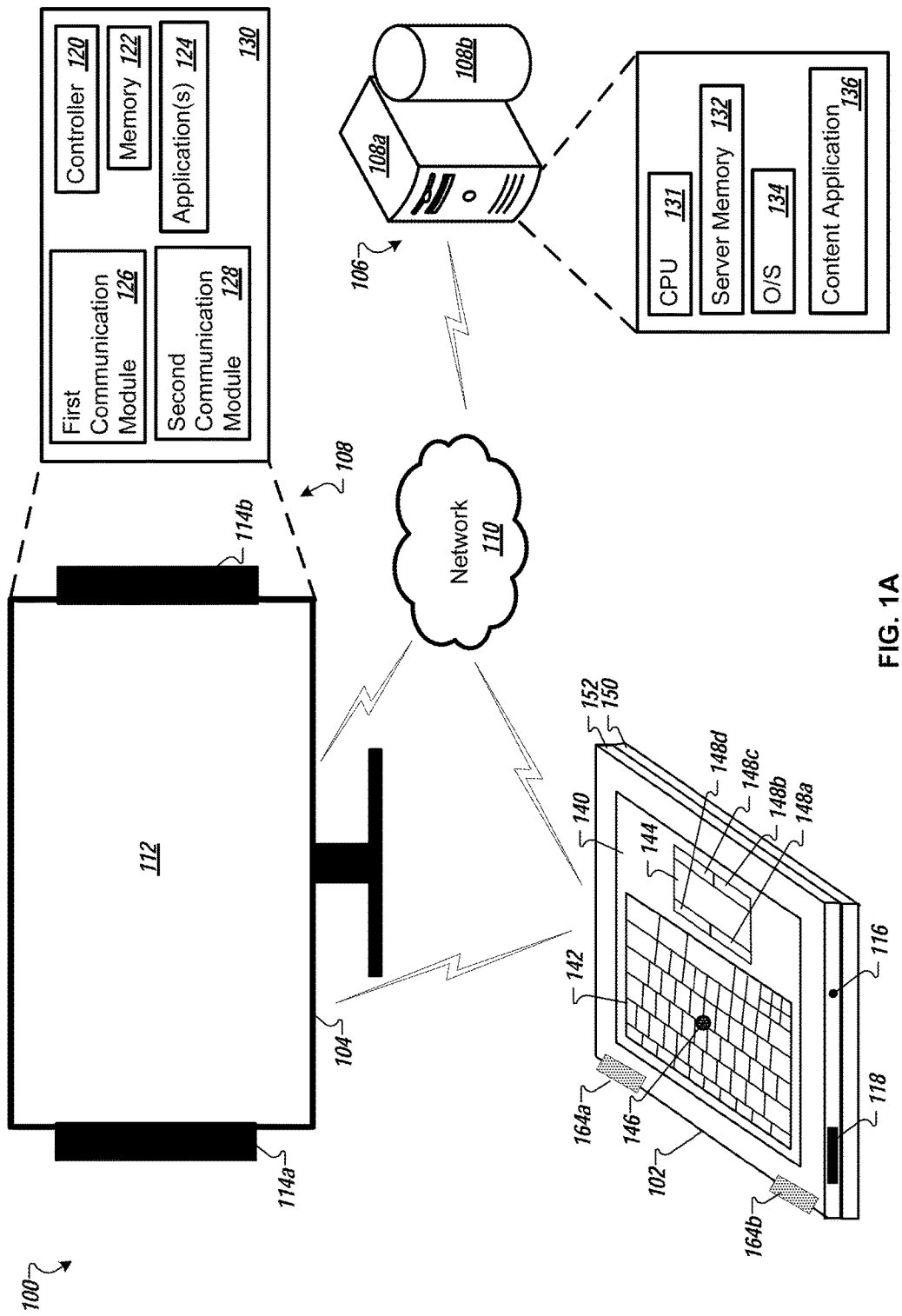
FIG. 1A is a diagram of an example system that includes a computing device in a fully open position.

A display device, such as a monitor or a television (TV), can display content to a user. Example display devices can include, but are not limited to, a flat screen TV, a flat panel high density TV (HDTV), a liquid crystal display device (LCD device), a light emitting diode (LED) display device, and a plasma screen TV. The display devices can receive input data and information for display. The display devices may also receive data and information for controlling the received input data for display. In some implementations, one or more peripheral input devices can provide input data to the display device. The one or more peripheral devices can include, but are not limited to, a keyboard, a mouse, a trackpad, a touchpad, a pointing stick, one or more mouse buttons, a trackball, a joystick, and other types of input devices.

In some implementations, a user of a display device may have one or more peripheral devices for use as input to the display device. For example, a user may purchase a keyboard, a touchpad, and/or a controller that includes one or more peripheral devices for controlling the display of the input data received by the display device. In some implementations, the peripheral device can wirelessly communicate with the display device. In some implementations, the peripheral device may require a wired connection to the display device. In these implementations, the display device and the one or more peripheral devices can be separate devices. The user may place the display device on a table or mount it on a wall while holding and interacting with a peripheral device, for example, placed on a lap of the user.

A computing device can include a plurality of input devices, which can include, but are not limited to, a keyboard, a mouse, a trackpad, a touchpad, a pointing stick, one or more mouse buttons, a trackball, and a joystick. The computing device can include a lid and a base. For example, a touchscreen can be a display device included in the lid of the computing device. One or more of the plurality of input devices can be included in the base of the computing device. The computing device can be placed in a laptop configuration (e.g., the lid is placed at an approximately 135-degree angle with respect to the base (see, for example, FIG. 1B and FIG. 3A)).

The lid of the computing device may be rotated about the base from a closed position (a closed configuration, a closed orientation) (e.g., a zero degree position of the lid with respect to the base, the lid is placed at approximately a zero-degree angle with respect to the base (see, for example, FIG. 1F)) to a fully open position (a fully open orientation, a fully open configuration) of the computing device (e.g., the lid is placed at approximately a 360-degree position with respect to the base, the lid is placed at approximately a 360-degree angle with respect to the base (see, for example, FIG. G and FIG. 1H)).

In the fully open orientation, a user may interface with the touchscreen of the display device included in the lid while not interacting with the input devices included in the base of the computing device. This first type of interaction with the computing device while placed in the fully open orientation can be referred to as a tablet mode of operation. In the fully open orientation, a user may interface with the input devices included in the base of the computing device while not interacting with the touchscreen of the display device included in the lid. This second type of interaction with the computing device while placed in the fully open orientation can be referred to as a peripheral mode of operation.

While in the peripheral mode of operation, the computing device can communicate with a separate display device such as a monitor or a TV. The separate display device can be external to the computing device. The computing device can include one or more sensors and/or control devices that can provide input to the computing device in order to automatically determine the mode of operation of the computing device when it is placed in the fully open position.

FIG. 1A is a diagram of an example system 100 that includes a computing device 102 in a fully open position. The computing device 102 in the fully open position shown in FIG. 1A is considered to be in a peripheral mode of operation. In the peripheral mode of operation, the computing device 102 can communicate with a display device 104 and a computer system 106. The computing device 102 can communicate with the computer system 106 by way of a network 110. The display device 104 can also communicate with the computer system 106 by way of the network 110.

For example, the display device 104 can be a monitor or a TV. The display device 104 can include a display area 112 and speakers 114a-b. Though shown as part of (connected to, integrated with) the display device 104, in some implementations, the speakers 114a-b can be separate devices. In some implementations, the separate (or stand-alone) speakers can be interfaced to (connected to, coupled to) the display device 104. In these implementations, the display device 104 can provide audio content for playing on the speakers 114a-b. In some implementations, the separate (or stand-alone) speakers can be interfaced to (connected to, coupled to) the network 110. In this implementation, the computer system 106 by way of the network 110 can provide audio content to the speakers 114a-b. Though two speakers are shown in FIG. 1A, the system 100 can include less than two speakers (e.g., one speaker) or more than two speakers (e.g., three or more speakers). In some implementations, the display device 104 may interface with one or more external speakers in addition to the speakers 114a-b.

The computing device 102 can include a headphone jack 116. For example, a user can connect headphones (or earbuds or in-ear headphones) to the computing device 102 using the headphone jack 116. The user can listen to audio output from the computing device 102 on the headphones. In addition, in some cases, the user may provide audio input to the computing device 102 using a microphone included in the headphones. The computing device 102 can include a microphone/speaker 118. A user can provide audio input to and listen to audio output from the microphone/speaker 118. A single microphone/speaker is shown in FIG. 1A, however in some implementations, the computing device 102 can include more than one microphone/speaker (e.g., two or more microphone/speakers, a single microphone/speaker and one or more additional speakers).

The display device 104 can include at least one of circuitry, hardware, firmware, and software (e.g., control circuitry and software 130). The display device 104 including the control circuitry and software 130 can also be referred to as a display system 108. For example, the hardware (control circuitry) can include a controller 120 and one or more memory devices (memory 122)). For example, the software can include one or more applications 124 stored in memory (e.g., the memory 122) and executable by the controller 120. The display device 104 can include hardware and software for use in communicating with the computer system 106 by way of the network 110 (e.g., first communication module 126). The first communication module 126 can be used to interface the display device 104 to the computer system 106 by way of the network 110. In some implementations, the hardware and software for use by the display device 104 can be included in a device separate from the display device 104, for example a dongle or other type of device that can be plugged into or interface with the display device 104. This will be described in more detail with reference to FIG. 2.

In some implementations, the computer system 106 can represent more than one computing device working together to perform server-side operations. For example, the system 100 can include a computer system that includes multiple servers (computing devices) working together to perform server-side operations. In this example, a single proprietor can provide the multiple servers. In some cases, the one or more of the multiple servers can provide other functionalities for the proprietor. In a non-limiting example, the computer system can also include a search server, a content server, a web crawler server, and a marketplace server.

The computer system 106 can include one or more computing devices (e.g., a server 108a) and one or more computer-readable storage devices (e.g., a database 108b). The server 108a can include one or more processors (e.g., a server CPU 131), and one or more memory devices (e.g., a server memory 132). The computing device 102 and the display device 104 can communicate with the computer system 106 (and the computer system 106 can communicate with the computing device 102 and the display device 104) using the network 110. The server 108a can execute a server O/S 134.

In some implementations, the server 108a can be a content server and the database 108b can be a content repository. The server 108a can execute a content application 136 that can provide content to the computing device 102 and the display device 104. In some cases, the content application 136 can provide content to the display device 104 and/or the speakers 114a-b under the initiation, control, and direction of the computing device 102.

The computing device 102 can be laptop computer, a notebook computer, a netbook computer, or a convertible computer (or any other type of computing device that can be used in one or more modes of operation) that can communicate with the display device 104 and that can communicate with the computer system 106 using the network 110. In some implementations, the computing device 102 can communicate directly with the display device 104. In some implementations, the computing device 102 can communicate with the display device 104 indirectly by way of the network 110. In some implementations, the computing device 102 can communicate with the display device 104 both directly and indirectly. In some implementations, the computing device 102 can perform client-side operations, as discussed in further detail herein and, in particular, as described with reference to FIG. 1B.

In some implementations, the network 110 can be a public communications network (e.g., the Internet, cellular data network, dialup modems over a telephone network) or a private communications network (e.g., private LAN, leased lines). In some implementations, the computing device 102 and the display device 104 can communicate with the network 110 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

The display device 104 can include hardware and software for use in communicating with the computing device 102 (e.g., second communication module 128). For example, the communication can be considered direct communication between the computing device 102 and the display device 104. The communication between the computing device 102 and the display device 104 may not be through the network 110. The second communication module 128 can be used to interface the display device 104 to the computing device 102. The display device 104 can communicate with the computing device 102 using one or more types of wireless communication protocols (e.g., WiFi, Bluetooth, Bluetooth Low Energy (LE), and wireless infrared communications (IrDA)). In some implementations, the wireless communication protocols can include those that may require close proximity of the display device 104 to the computing device 102 (e.g., near-field communication (NFC) protocols, Bluetooth, Bluetooth LE, and IrDA). The communication between the display device 104 and the computing device 102 when in close proximity may be referred to as short-range communication or, in the case of wireless communication, may be referred to short-range wireless communication. In some implementations, the display device 104 can include hardware and software enabling connectivity to the computing device 102 using one or more types of wired connections and protocols (e.g., Universal Serial Bus (USB) connections and protocols).

The computing device 102 can include an input area 140. The input area 140 includes multiple input devices, such as a keyboard 142, a trackpad 144, a pointer button 146, and mouse buttons 148a-d. A user can interact with one or more of the multiple input devices when the computing device 102 is in a fully open position and in a peripheral mode of operation (as shown in FIG. 1A). In the peripheral mode of operation, a lid portion 150 (which can also be referred to as a lid) of the computing device 102 is placed below or under a base portion 152 (which can also be referred to as a base) of the computing device 102. The base portion 152 of the computing device 102 (e.g., the base portion including the input area 140) is placed face-up so that the user can access the multiple input devices included in the input area 140. When in the peripheral mode of operation, a user can interface with the multiple input devices to control the displaying of content in the display area of the display device 104 and/or the playing of audio content on the speakers 114a-b. As described herein, the computing device 102 can include hardware and software to enable and detect the placement of the computing device 102 into the fully open position and further into the peripheral mode of operation.

Figure 1B:
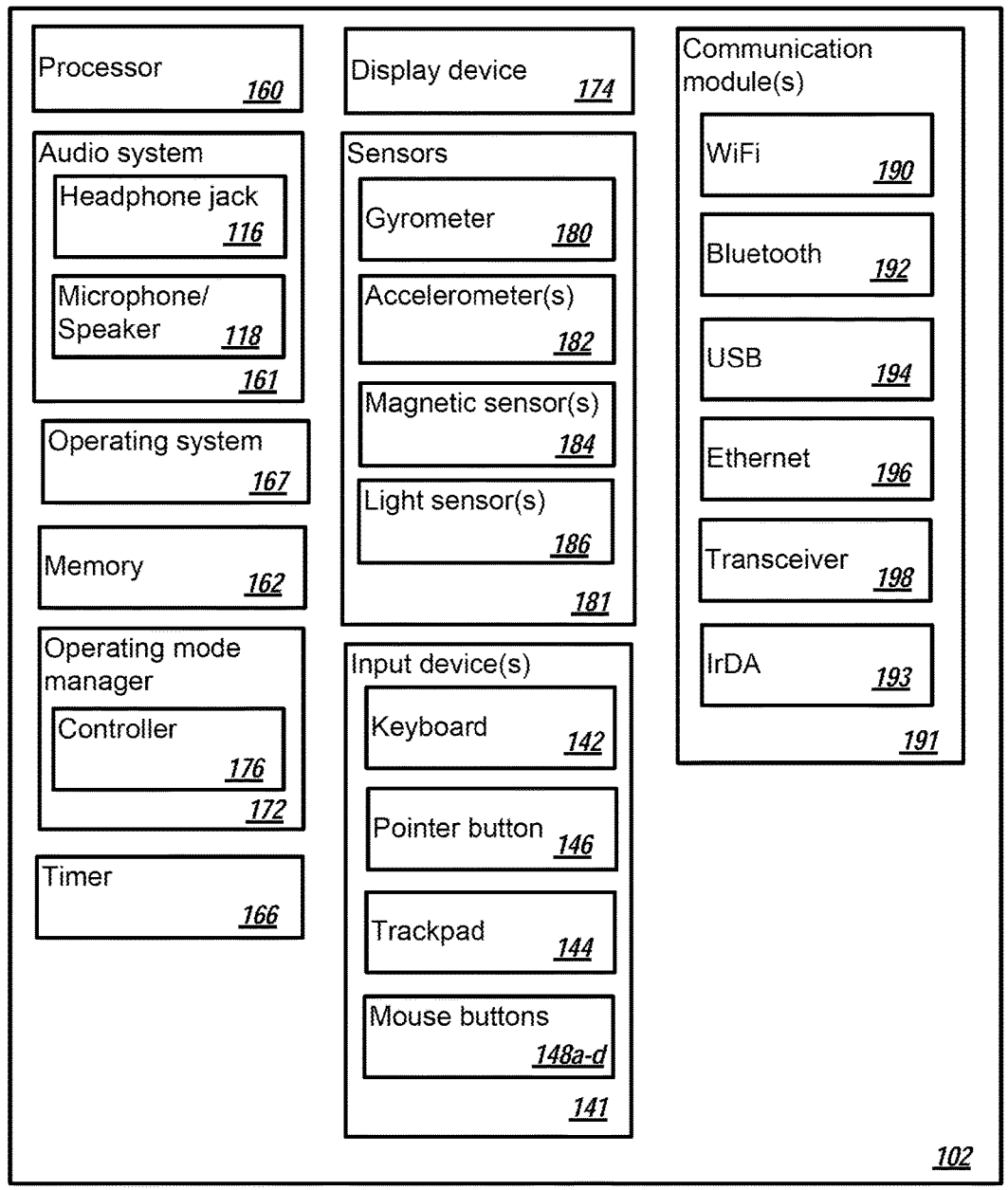
FIG. 1B is a block diagram of an example computing device that can be placed in multiple modes of operation dependent at least in part on a position of a lid portion of the computing device with respect to a base portion of the computing device.

FIG. 1B is a block diagram of an example computing device (e.g., the computing device 102 as shown in FIG. 1A) that can be placed in multiple modes of operation dependent at least in part on a position of the lid portion 150 with respect to the base portion 152. As described, the computing device 102 may take the form of a laptop computer, a netbook computer, a notebook computer, or another type of convertible computer (or any other type of computing device that can be used in one or more modes of operation). As shown in FIG. 1B, the computing device 102 includes a number of modules, components, and devices that include hardware and/or software.

It will be appreciated that the specific elements shown in FIG. 1B are shown for illustrative purposes and by way of example. In other implementations and examples, a computing device may include fewer elements, additional elements, or may substitute certain elements with other elements. The various elements of the computing device 102 may be operationally coupled with one another in a number of appropriate manners. For example, a processor 160 of the computing device 102 may be operationally coupled with one or more of the other elements of the computing device 102 using a bus, or multiple busses.

In some implementations, a single element of the computing device 102 may be implemented as multiple elements, or may include multiple sub-elements. For example, a memory 162 may be implemented as separate volatile (e.g., random-access memory (RAM)) and non-volatile (NV) memory (e.g., NVRAM, a hard disk drive and/or a flash memory drive) elements. In some implementations, volatile and non-volatile memory may be implemented as sub-elements of the memory 162. In some implementations, the input devices 141 can include multiple input devices (e.g., referring to FIG. 1, the keyboard 142, the trackpad 144, the pointer button 146, and the mouse buttons 148a-d). It will be appreciated that the particular arrangement of elements of a computing device, such as the computing device 102, will depend, at least in part, on the specific implementation.

As shown in FIG. 1B, the computing device 102 includes an operating system (OS) 167 and an operating mode manager 172. The operating mode manager 172 can include a controller 176. In some implementations, these elements may be combined into a single element. For example, the operating mode manager 172, or portions of the operating mode manager 172, may be implemented as part of the operating system 167. In some implementations, the operating mode manager 172 may be implemented in firmware of the computing device 102. In some implementations, the functions of the operating mode manager 172, such as described herein, may be implemented by one or more other elements of the computing device 102.

The computing device 102 includes one or more communication modules 191. The communication modules 191 can include, but are not limited to, a USB communication module 194, a WiFi communication module 190, a Bluetooth communication module 192, a transceiver 198, an IrDA communication module 193, and an Ethernet (e.g., IEEE 802.3) communication module 196. In some implementations, the computing device 102 may include all of the communication modules 191. In some implementations, the computing device 102 may include less than all of the communication modules 191. The communication modules 191 can be used to establish connections and communication between the computing device 102, one or more external networks (e.g., the network 110), and/or one or more external devices (e.g., the display device 104). These connections and communications are described herein and, in particular, with reference to FIG. 1A.

For example, the transceiver 198 can be used to wirelessly interface (connect) the computing device 102 to a cellular telecommunications network (a cellular data network). For example, the computing device 102 can an Ethernet port (receptacle or connector) (e.g., an RJ-45 connector). One end of an Ethernet cable can be plugged into the Ethernet connector on the computing device 102. The other end of the Ethernet cable can be plugged into, for example, an Ethernet port on a router (e.g., a broadband router), or an uplink port on a broadband modem (e.g., a wide area network (WAN) port). The router or modem can provide a connection to a network (e.g., the network 110).

The computing device 102 includes sensors 181. The sensors 181 can be configured to detect the occurrence of certain events. The events can include, but are not limited to, changes in a physical orientation of the computing device 102, changes in an ambient environment of the computing device 102, movement of the computing device 102 as a whole, and movement of the position of the lid (e.g., lid portion 150) of the computing device 102 with respect to the base (e.g., base portion 152) of the computing device 102. As described herein, in response to detecting such events, the sensors 181 may be configured to provide information to the controller 176 (and/or the processor 160) about one or more detected events. In the computing device 102, the operating mode manager 172 (e.g., using the controller 176) may be configured, based on the information provided by the sensors 181, to identify an operating mode for the computing device 102 and transition the computing device 102 to the identified mode of operation, such as described herein.

As shown in FIG. 1B, the sensors 181 include a gyrometer 180, one or more accelerometers (accelerometer(s) 182), one or more magnetic sensors (magnetic sensor(s) 184), and one or more light sensors (light sensor(s) 186). In some implementations, the computing device 102 may include all of the sensors 181. In some implementations, the computing device 102 may include less than all of the sensors 181. As described herein, the sensors 181 can be configured to detect the occurrence of various events and provide information regarding such events to the operating mode manager 172.

For example, the gyrometer 180 can be configured to detect changes in physical orientation of the computing device 102 (e.g., between a vertical orientation and a horizontal orientation). For example, the magnetic sensor(s) 184 can include Hall effect sensors in the base portion 152 of the computing device 102 and one or more magnets in the lid portion 150 of the computing device 102. A magnetic sensor can be used to detect when a computing device is being closed. A magnetic sensor changes state (triggers) and provides an output when a magnet is within a detectable field of the sensor. As a user closes the computing device, the magnetic sensor in the lid of the computing device is brought increasing closer to the magnet in the base of the computing device. Once the magnet in the base is within the detectable field of the magnetic sensor in the lid, the magnetic sensor changes state (triggers) and provides an output indicative of the proximity of the lid to the base. The output of the magnetic sensor(s) 184 can be provided to the operating mode manager 172. The operating mode manager 172 can use the magnetic sensor output data to identify an operating mode of the computing device 102.

For example, the accelerometer(s) 182 can include a base accelerometer (e.g., a three-axis accelerometer) included in the base portion 152 of the computing device 102 and a lid accelerometer (e.g., a three-axis accelerometer) included in the lid portion 150 of the computing device 102. The computing device 102 can use information and data provided by the accelerometer(s) 182 to determine the motion of the lid portion 150 of the computing device 102 relative (or with respect) to the base portion of the computing device 102. In addition, or in the alternative, the computing device 102 can use the accelerometer(s) 182 to determine, once the motion has stopped, the angle of the lid relative to the base. The accelerometer data can be provided to the operating mode manager 172. The operating mode manager 172 can use the accelerometer date to identify an operating mode of the computing device 102.

The light sensor(s) 186 can be configured to detect changes in light intensity in the ambient environment of the computing device 102. For example, the light sensor(s) 186 may be located (placed) in the computing device 102 such that when the computing device 102 is placed in the fully open position and the lid portion 150 is placed on a surface (e.g., a tabletop, a lap of a user, etc.), the light sensor(s) 186 may detect little or no light (the one or more light sensors 186 are substantially blocked). The detected low light level combined with the computing device 102 determining that it has been placed in a fully open position can indicate that a user wants to operate the computing device 102 as a peripheral device. For example, referring to FIG. 1B, the operating mode manager 172 can receive sensor data and place the computing device 102 in the peripheral mode of operation.

Based on information provided by the sensors 181 regarding the detection of certain events, the operating mode manager 172 can select a mode of operation for the computing device 102 and then initiate, or cause the computing device 102 to transition to, the selected operating mode. Such approaches may improve an experience of a user when using the computing device 102, as the computing device 102 can change operating modes (e.g., a laptop mode of operation to a peripheral mode of operation and vice versa) in response to events detected by the sensors 181. Information regarding events detected by the sensors 181 can be used alone, or in combination with each other to select a mode of operation for the computing device 102.

The computing device 102 includes a timer 166. In some implementations, the operating mode manager 172 can use information provided by the timer along with information provided by one or more of the sensors 181 and/or along with information provided by one or more input device(s)

and/or along with information provided by a touchscreen as the display device 174 to determine an operating mode for the computing device 102.

The processor 160 can process instructions for execution within the computing device 102. The instructions can be included as part of the operating system 167. The instructions can be stored in the memory 162. The instructions can be included as part of the operating mode manager 172. The instructions can be executed to control the operations of the audio system 161, the display device 174, the sensors 181, the one or more input devices 141, the one or more communication modules 191, and the timer 166.

Figure 1C:
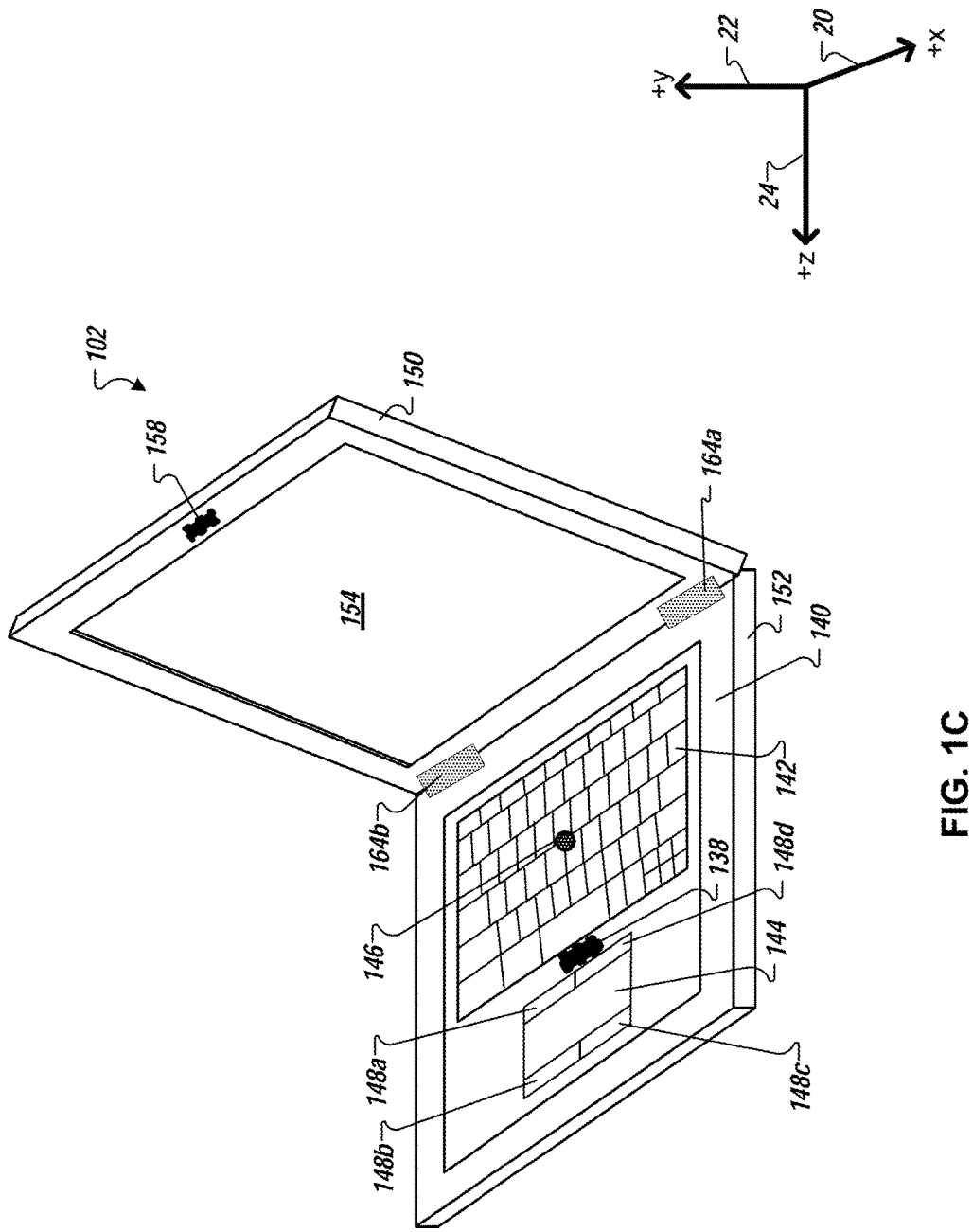
FIG. 1C is a diagram of an example computing device in an open position.

FIG. 1C is a diagram of an example computing device (e.g., the computing device 102) in an open position (e.g., a laptop configuration). For example, in the open position, the computing device 102 can be used in a laptop mode of operation (a laptop operating mode). Referring to FIG. 1A, the computing device 102 includes the lid portion 150 and the base portion 152. The base portion 152 includes the input area 140. The input area 140 includes, for example, the keyboard 142, the trackpad 144, the pointer button 146, and the mouse buttons 148a-d.

The lid portion 150 includes a display area 154. The display area 154 can include a touch-sensitive display device (e.g., a touchscreen) that is part of (mounted on, mounted in) the lid portion 150 of the computing device 102. For example, the display device 174 as shown in FIG. 1B can be included in the display area 154.

As shown in FIG. 1A, the input area 140 includes multiple input devices (e.g., the keyboard 142, the trackpad 144, the pointer button 146, and the mouse buttons 148a-d). For example, a user can interact with one or more of the multiple input devices when providing input to and/or otherwise controlling the operation of an application running on the computing device 102 while in the laptop mode of operation. In addition or in the alternative, a user can interact with the computing device 102 by making direct contact with (e.g., touching with one or more fingers) the touch-sensitive surface of a touch-sensitive display device included in the display area 154 when providing input to and/or otherwise controlling the operation of an application running on the computing device 102.

For example, the computing device 102 can include a lid accelerometer 158 and a base accelerometer 138. For example, referring to FIG. 1B, the lid accelerometer 158 and the base accelerometer 138 can be included in the accelerometer(s) 182. The lid accelerometer 158 and the base accelerometer 138 can be configured to detect changes in vibrations, or patterns of vibrations occurring in an ambient environment of the computing device 102, such as may be caused by footsteps of a person or persons walking near the computing device 102. In addition or in the alternative, the lid accelerometer 158 and the base accelerometer 138 can be configured to detect movement of the computing device 102. The detected movement can be an amount of motion (e.g., how far the computing device 102 is moved). The detected movement can be a type of motion imparted to the computing device 102 (e.g., twisting or rotating, moving side-to-side or back and forth). The detected motion can be movement of one portion of the computing device 102 relative to the other portion. For example, the lid portion 150 of the computing device 102 can be moved relative to the base portion 152 of the computing device 102. The detected movement of the computing device 102 can be used to identify a particular mode of operation for placing the computing device 102 into.

For example, the lid accelerometer 158 and the base accelerometer 138 can be three-axis accelerometers. In general, a three-axis accelerometer can detect acceleration along each of three axes (e.g., x-axis 20, y-axis 22, and z-axis 24). The lid accelerometer 158 and the base accelerometer 138 can detect movement of the computing device 102 along an x-axis 20, a y-axis 22, and a z-axis 24.

The computing device 102 as a whole can move in many directions. In addition, the lid portion 150 of the computing device 102 can move relative to the base portion 152, and the base portion 152 of the computing device 102 can move relative to the lid portion 150. The lid portion 150 is mechanically coupled to (mechanically connected to) the base portion 152. For example, hinges 164a-b attach (mechanically couple) the lid portion 150 to the base portion 152 and allow movement of the lid portion 150 and the base portion 152 relative to one another. Though shown as two hinges 164a-b, more than two hinges or a single hinge can be used to attach the lid portion 150 to the base portion 152.

FIG. 1D is a diagram that illustrates a side-view of an example computing device (e.g., the computing device 102) in a first position (e.g., an open position, a laptop configuration). FIG. 1D can be the side view of the computing device 102 as shown in FIG. 1C. In the first position, for example, the lid portion 150 is at an angle 30 that is approximately 120-degrees (i.e., 120 degrees±20 degrees) with respect to the base portion 152. The computing device 102 can assume a particular operating mode (e.g., a laptop mode) based on the identified angle (angle 30) between the lid portion 150 and the base portion 152 of the computing device 102.

Figure 1E:
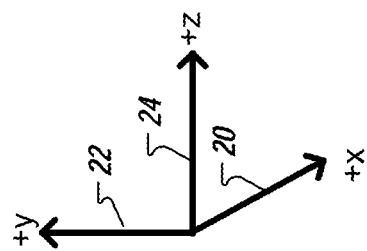
FIG. 1E is a diagram that illustrates a side-view of an example computing device where a lid portion of the computing device is rotated about one or more hinges and placed in a second position (e.g., a tent configuration).
Figure 1E:
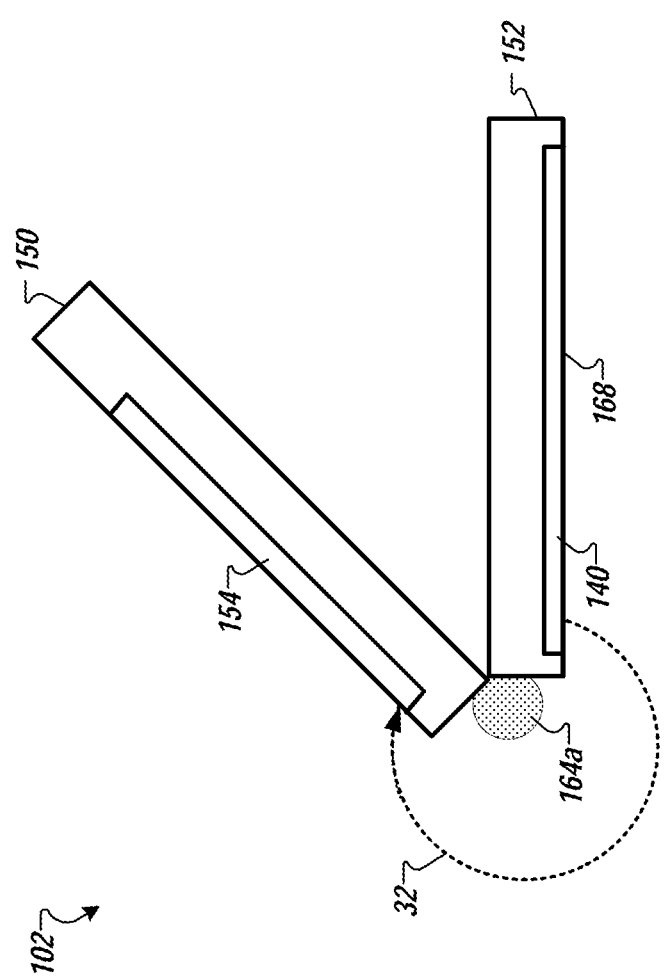

FIG. 1E is a diagram that illustrates a side-view of an example computing device (computing device 102) where the lid portion 150 is rotated about one or more hinges (e.g., hinge 164a) and placed in a second position (e.g., a tent configuration). In the second position, the lid portion 150 is at an angle 32 that is approximately 315-degrees (i.e., 315 degrees±20 degrees) with respect to the base portion 152. The computing device 102 can assume a particular operating mode (e.g., the computing device 102 can be used as a tablet (be put into a tablet mode of operation) placed in a tent configuration) based on the identified angle (angle 32) between the lid portion 150 and the base portion 152 of the computing device 102.

In the example shown in FIG. 1E, the computing device 102 can include a display area 154 that includes a touch-sensitive display device (e.g., a touchscreen) that is part of (or mounted in) the lid portion 150 of the computing device 102. In the second position, for example, a user can interact with the touchscreen display alone, using the computing device 102 as a tablet or in a tablet mode of operation. In some implementations, the computing device 102 may disable input and/or otherwise ignore input received from one or more input devices included in the input area 140 based on the identified operating mode of the computing device 102. The computing device 102 may be placed on a horizontal surface where a top surface (or side) 168 of the base portion 152 may be placed on and/or make contact with a horizontal (or nearly horizontal) surface making interaction with the input devices included in the input area 140 not easily possible.

Figure 1F:
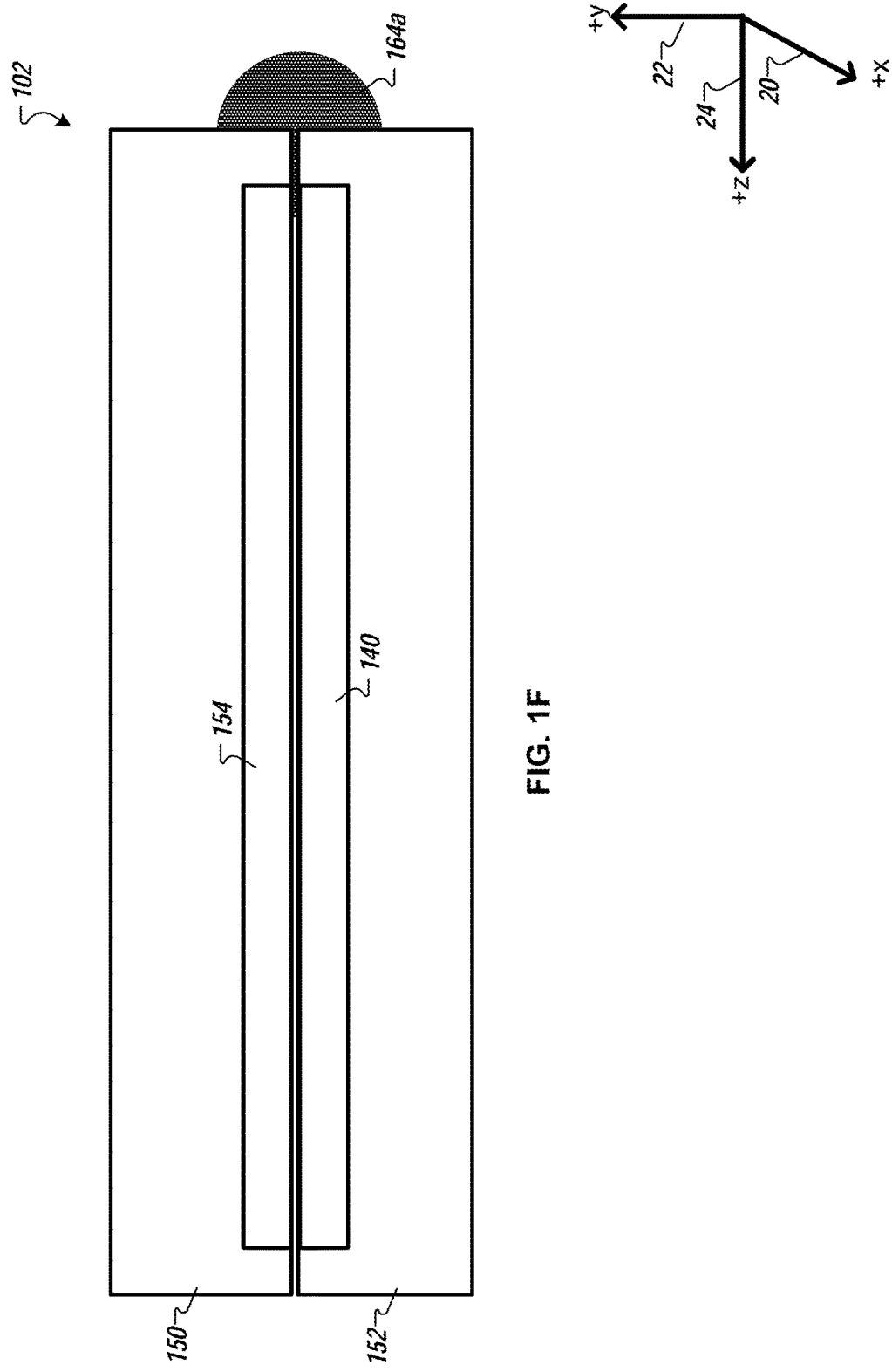
FIG. 1F is a diagram that illustrates a side-view of an example computing device in a closed position.

FIG. 1F is a diagram that illustrates a side-view of an example computing device (e.g., computing device 102) in a closed position. When the computing device 102 is in the closed position, a value of a lid angle is substantially equal to zero. The input area 140 and the display area 154 of the computing device 102 may not be accessible by a user of the computing device 102. A computing device when in a closed position may be put into one or more lower power operating modes (e.g., a sleep mode, a hibernation mode, etc.). In some cases, the computing device may be completely powered off.

Figure 1G:
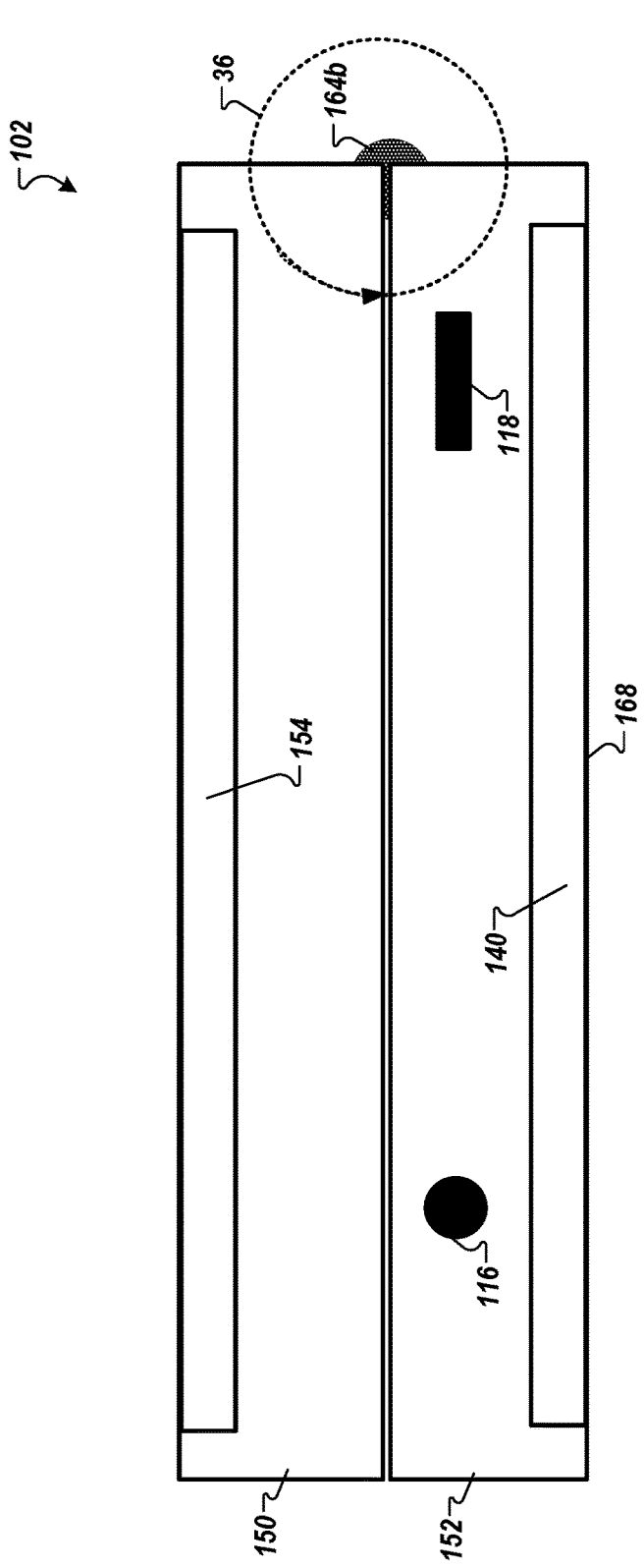
FIG. 1G is a diagram that illustrates a side-view of an example computing device in a fully open position (e.g., a fully open orientation).
Figure 1G:
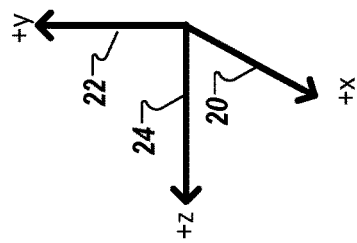

FIG. 1G is a diagram that illustrates a side-view of an example computing device (e.g., the computing device 102) in a fully open position (e.g., a fully open orientation). When the computing device 102 is in the fully open position, a value of a lid angle 36 is substantially equal to 360-degrees because the lid portion 150 has been rotated around the base portion 152 such that the display area 154 and the input area 140 can be accessible to a user. The computing device 102 as shown in the position illustrated in FIG. 1G can be used in a tablet mode of operation when a touchscreen is incorporated into the display area 154. In the tablet mode of operation, input devices included in the input area 140 may be disabled. The computing device 102 may be placed on a horizontal surface where the top surface 168 of the base portion 152 may be placed on and/or make contact with a horizontal (or nearly horizontal) surface making interaction with the input devices included in the input area 140 not easily possible.

Figure 1H:
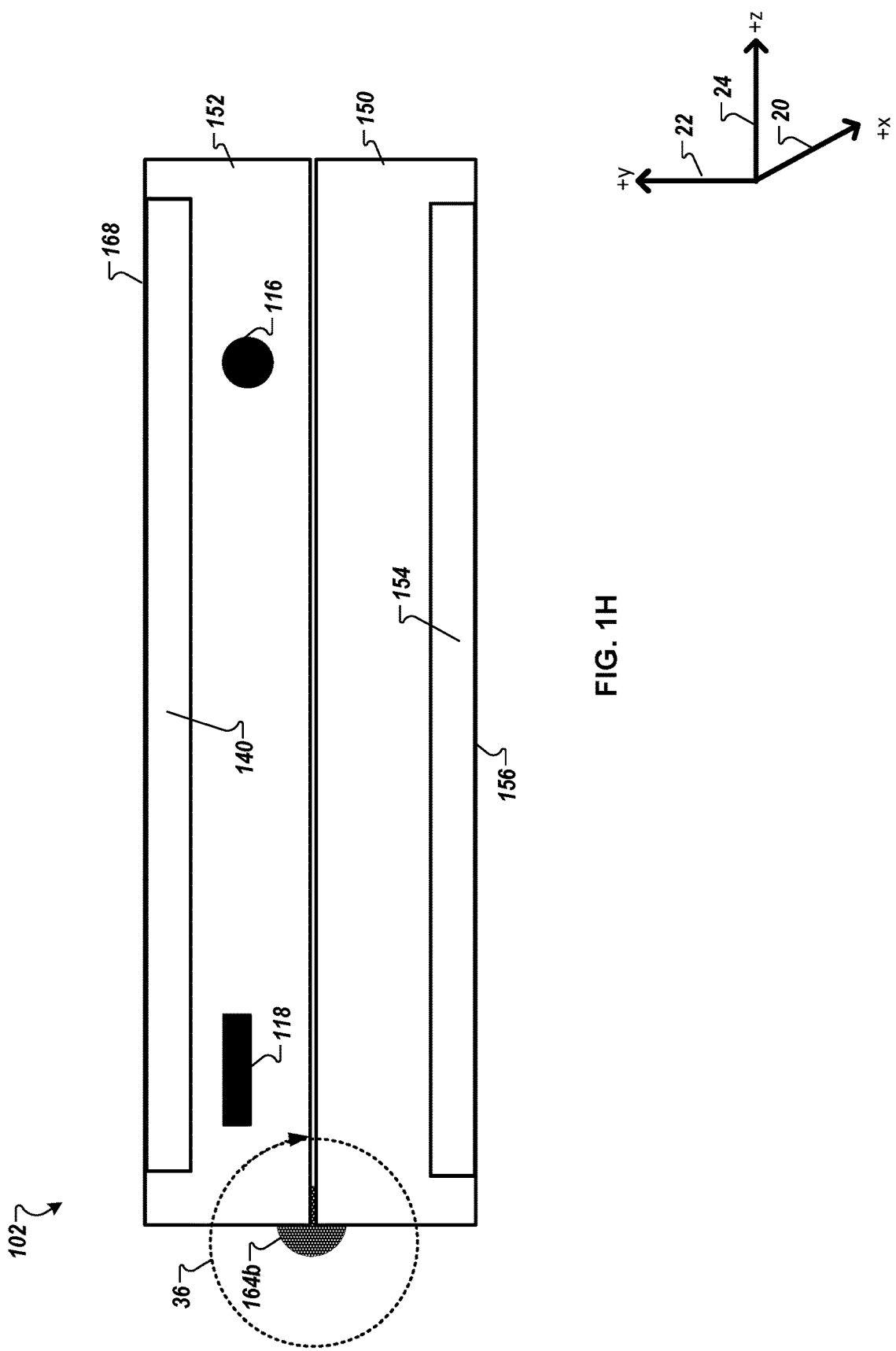
FIG. 1H is a diagram that illustrates another side-view of an example computing device in a fully open position (e.g., a fully open orientation).

FIG. 1H is a diagram that illustrates another side-view of an example computing device (e.g., computing device 102) in a fully open position (e.g., a fully open orientation). FIG. 1H can be the side view of the computing device as shown in FIG. 1A. When the computing device 102 is in the fully open position, a value of a lid angle 36 is substantially equal to 360-degrees because the lid portion 150 has been rotated around the base portion 152 such that the display area 154 and the input area 140 can be accessible to a user. The computing device 102 as shown in the position illustrated in FIG. 1H can be used in a peripheral mode of operation. In the peripheral mode of operation, a user may interact with one or more input devices included in the input area 140. A display device included in the display area 154 may be disabled. The computing device 102 may be placed on a horizontal surface where a top surface (or side) 156 of the lid portion 150 may be placed on and/or make contact with a horizontal (or nearly horizontal) surface.

Figure 2:
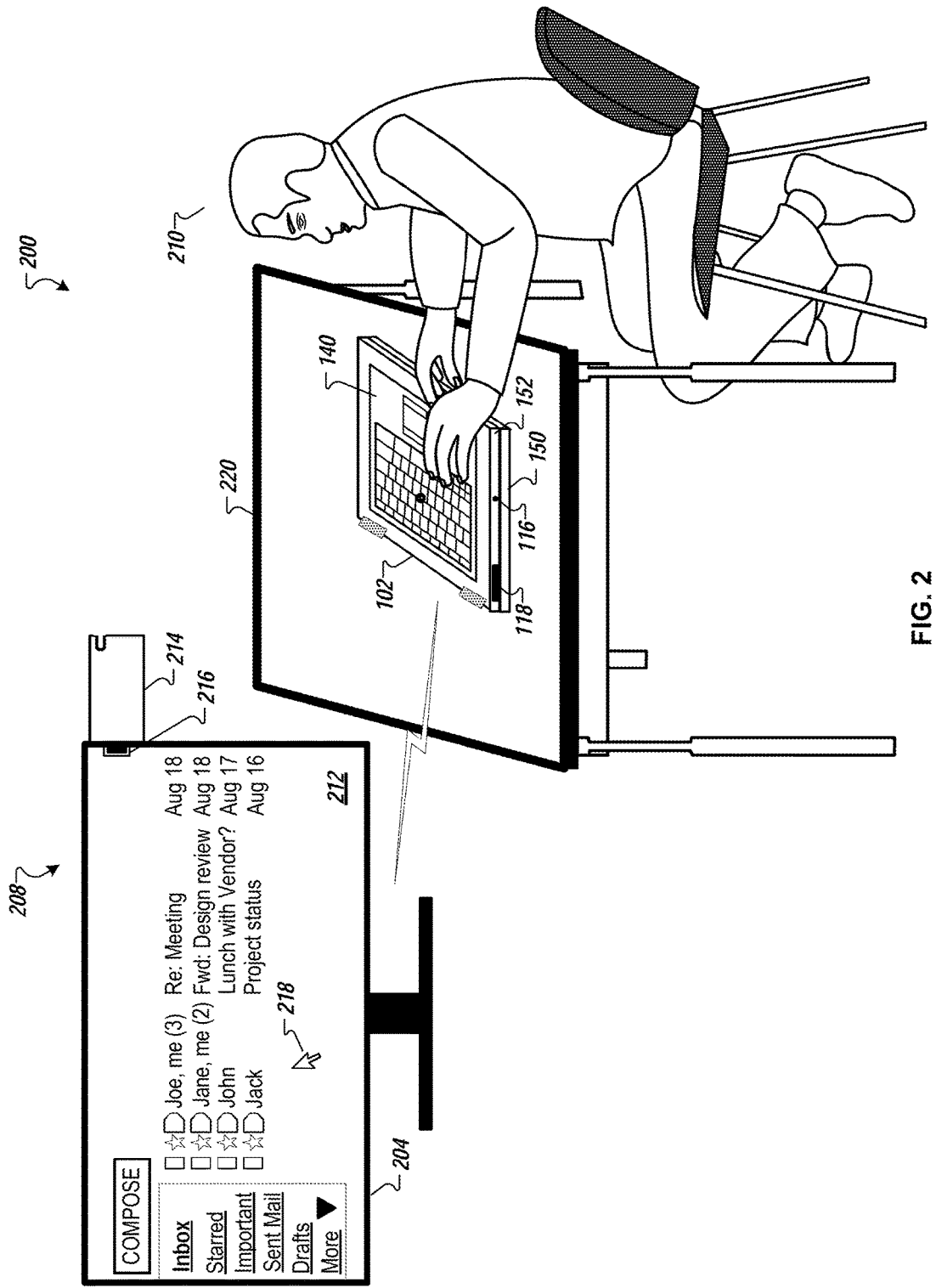
FIG. 2 is a diagram that illustrates a user interacting with a computing device in a first scenario.

FIG. 2 is a diagram that illustrates a user 210 interacting with a computing device (e.g., the computing device 102) in a first scenario 200. In the first scenario 200, the computing device is in a fully open position, is in a peripheral mode of operation, and is placed on a table 220 with the lid portion facing (placed on) a surface of the table (the top of the table). As shown in FIG. 2, the computing device 102 is in a fully open position where the lid portion 150 of the computing device 102 has been rotated around the base portion 152. The lid portion 150 is placed on and/or makes contact with a horizontal (or nearly horizontal) surface of the table 220 and the input area 140 is accessible to the user 210. The fully open position of the computing device 102 while in a peripheral mode of operation is described with reference, for example, to FIG. 1A and FIG. 1H.

Referring to FIG. 1B, while in the peripheral mode of operation, the user 210 of the computing device 102 can control and interact with content provided to and displayed in a display area 212 of a display device 204 using the one or more input devices 141. The computing device 102 can enter a peripheral mode of operation dependent on an identified configuration of the computing device 102 as determined by data provided by one or more sensors (e.g., the sensors 181) included in the computing device 102.

For example, data provided by the accelerometer(s) 182 to the operating mode manager 172 can be used to determine that the computing device 102 is in a fully open position. Data provided by the gyrometer 180 can determine whether the base portion 152 or the lid portion 150 is in contact with the surface of the table 220, and therefore, cannot be accessed by the user 210. In addition or in the alternative, magnetic sensors(s) 184 can provide data to the operating mode manager 172 that can also be used by the operating mode manager 172 to determine a mode of operation for the computing device 102. In some implementations, additional sensors (e.g., the light sensor(s) 186) may also provide data to the operating mode manager 172 that can also be used by the operating mode manager 172 to determine a mode of operation for the computing device 102.

In some implementations, in addition to the data provided to the operating mode manager 172, user input received from a touchscreen or from one or more input devices (e.g., the keyboard 142, the trackpad 144, the pointer button 146, and the mouse buttons 148a-d) can be used to confirm the peripheral mode of operation. For example, a user can select a button or other icon provided on a user interface displayed on the display device 174 to confirm the entering of the peripheral mode of operation by the computing device 102 when the computing device 102 is placed in the fully open mode. In another example, the user can select another button or icon provided on the user interface to override the entering of the peripheral mode of operation by the computing device 102 when the computing device 102 is placed in the fully open mode. In some cases, a user can interact with the one or more input devices to provide input to the computing device 102 that can either confirm the entering of the peripheral mode of operation by the computing device 102 when the computing device 102 is placed in the fully open mode or override the entering of the peripheral mode of operation by the computing device 102 when the computing device 102 is placed in the fully open mode. Overriding the peripheral mode of operation may then place the computing device 102 into a tablet mode of operation.

In some implementations, when the computing device 102 is placed in a fully open position (the computing device 102 detects (determines) that it is in a fully open position), not receiving any input from a touchscreen for a particular amount of time (e.g., five seconds, ten seconds) after the detected fully open position can indicate that the user intends to use the computing device 102 in the peripheral mode of operation. Once the particular amount of time has transpired and no input has been received by the touchscreen, the operating mode manager 172 can determine that the user wants to interact with the computing device 102 in a peripheral mode of operation. The computing device 102 can then be placed into the peripheral mode of operation.

Once the computing device 102 enters a peripheral mode of operation, the computing device 102 can enable near-field communications (e.g., Bluetooth, Bluetooth LE), can enter a discovery mode, and can broadcast information about the computing device 102 for other near-field communication devices (e.g., Bluetooth or Bluetooth LE enabled devices) to discover. The computing device 102 can broadcast an identifier (ID) that can be picked up by other devices capable of near-field communications.

In some implementations, once the computing device 102 enters a peripheral mode of operation, the computing device 102 can enable near-field communications (e.g., Bluetooth, Bluetooth LE), can enter a listening mode, and can listen for information broadcasted from other near-field communication devices (e.g., Bluetooth or Bluetooth LE enabled devices) to discover. The computing device 102 can pick up an identifier (ID) that can be broadcasted by other devices capable of near-field communications.

Referring to FIG. 2, a dongle 214 can be interfaced to (plugged into) the display device 204 by way of a connector 216 included on the display device 204. The display device 204 and the dongle 214 can be referred to as a display system 208. The display system 208 can be capable of near-field communication. The dongle 214 can include at least one of circuitry, hardware, firmware, and software that the display device 204 can use when communicating with an external device using near-field communications. The near-field communications can include, but are not limited to, Bluetooth, Bluetooth LE, and other proprietary types of near-field communications. The dongle 214 can include at least one of circuitry, hardware, firmware, and software that the display device 204 can use when communicating with an external network (e.g., the network 110) by way of other communication protocols (e.g., WiFi).

For example, referring to FIG. 1A, the control circuitry and software 130 can be included in the dongle 214. In some implementations, the circuitry, hardware, and firmware included on the dongle 214 may be incorporated into (built into and included as part of) the display device 204 (e.g., the display device 204 can be a smart TV as shown, for example, as the display device 104 in FIG. 1A). In some implementations, part of (not all of) the control circuitry and software 130 can be incorporated into the dongle 214, and part of (not all of) the hardware and software can be incorporated into (included in) the display device 204.

The computing device 102 in the peripheral mode of operation can connect to the display system 208 (the display device 204 by way of the dongle 214) enabling near-field communication between the display system 208 and the computing device 102 in the peripheral mode of operation. In some cases, the connection can be automatic. In some cases, the connection may require confirmation by the user 210 for the connection. In these cases, the user 210 may interact with the one or more input devices 141 to provide the confirmation to the display device 204. Once near-field communication is established between the computing device 102 in the peripheral mode of operation and the display system 208, the user 210 can interact with one or more of the input device(s) 141 providing inputs to and control of content displayed in the display area 212 of the display device 204. In the example shown in FIG. 2, the user 210 is viewing email. The user can control the email application to open, compose, and send email messages, for example, by interacting with the keyboard 142, pointer button 146, trackpad 144 and mouse buttons 148a-d.

In some cases, a user (e.g., the user 210) can use (operate) the computing device 102 in a laptop mode of operation (e.g., as shown in FIGS. 1C and 1D) or a tablet mode of operation (e.g., as shown in FIGS. 1E and 1G). Referring also to FIG. 1B, in these modes of operation, the user can interact with the one or more input devices 141 and/or a touchscreen included as the display device 174. Referring to FIG. 1A, the computing device 102 can be connected to the computer system 106 by way of the network 110 while in the laptop or tablet mode of operation. The user can log into service(s) provided by the computer system 106 using credentials for the user. Because the user is logged into the account of the user for the service(s), the computing device 102 can access the service(s).

In addition, the display system 208 can access the service(s) by way of a network (e.g., the network 110) using another communication connection. The user can put the computing device 102 into a peripheral mode of operation while remaining logged into the service(s). Once near-field communications between the computing device 102 and the display system 208 are established, if the user remains logged into the account of the user using the computing device 102, the service(s) available for access by the user may now be available for access by the display system 208. The user can interact with the available service(s) using the computing device 102 in the peripheral mode of operation while interfaced with the display system 208 without the need for further or additional authentication processes. This allows for a seamless transition for a user to access and interact with authenticated service(s) using the display system 208 and the computing device 102 in the peripheral mode of operation.

Figure 3:
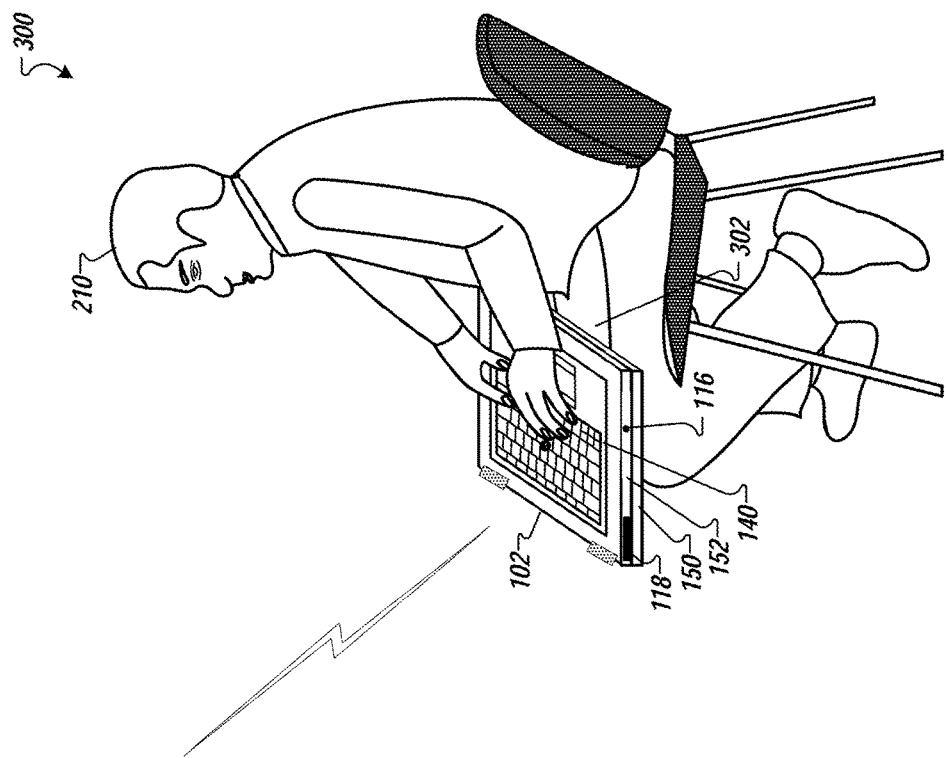
FIG. 3 is a diagram that illustrates a user interacting with a computing device in a second scenario.
Figure 3:
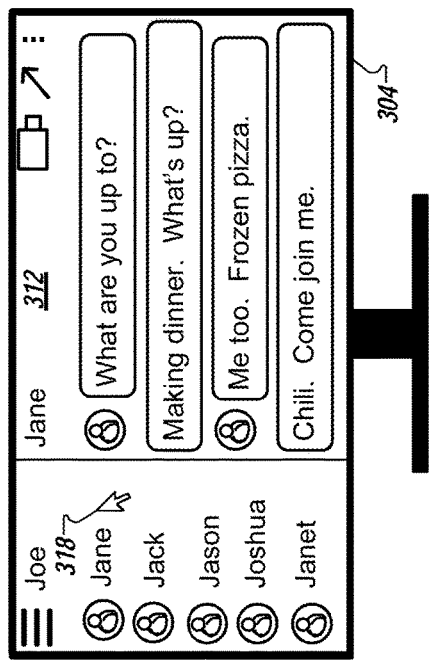

FIG. 3 is a diagram that illustrates the user 210 interacting with a computing device (e.g., the computing device 102) in a second scenario 300. In the second scenario 300, the computing device is in a fully open position, is in a peripheral mode of operation, and is placed on a lap 302 of the user 210 with the lid portion facing (placed on) the lap 302 of the user 210. As shown in FIG. 3, the computing device 102 is in a fully open position where the lid portion 150 of the computing device 102 has been rotated around the base portion 152. The lid portion 150 is placed on and/or makes contact with the lap 302 of the user 210 and the input area 140 is accessible to the user 210. The fully open position of the computing device 102 while in a peripheral mode of operation is described with reference, for example, to FIG. 1A and FIG. 1G.

For example, referring to FIG. 1A, the control circuitry and software 130 can be included in a display device 304. The display device 304 can also be referred to as a display system. Referring to FIG. 2, the computing device 102 can be placed into and detected in a peripheral mode of operation. The computing device 102 can connect to the display device 304 in a similar manner as described with reference to FIG. 2. If the user 210 has logged into the account of the user for one or more services, the computing device 102 and the display device 304 can access the service(s).

Referring to FIG. 1B, while in the peripheral mode of operation, the user 210 of the computing device 102 can control and interact with content provided to and displayed in a display area 312 of the display device 304 using the one or more input devices 141. In the example shown in FIG. 3, the user 210 is chatting (messaging) online with another user while logged into, for example, an online messaging application.

Figure 4:
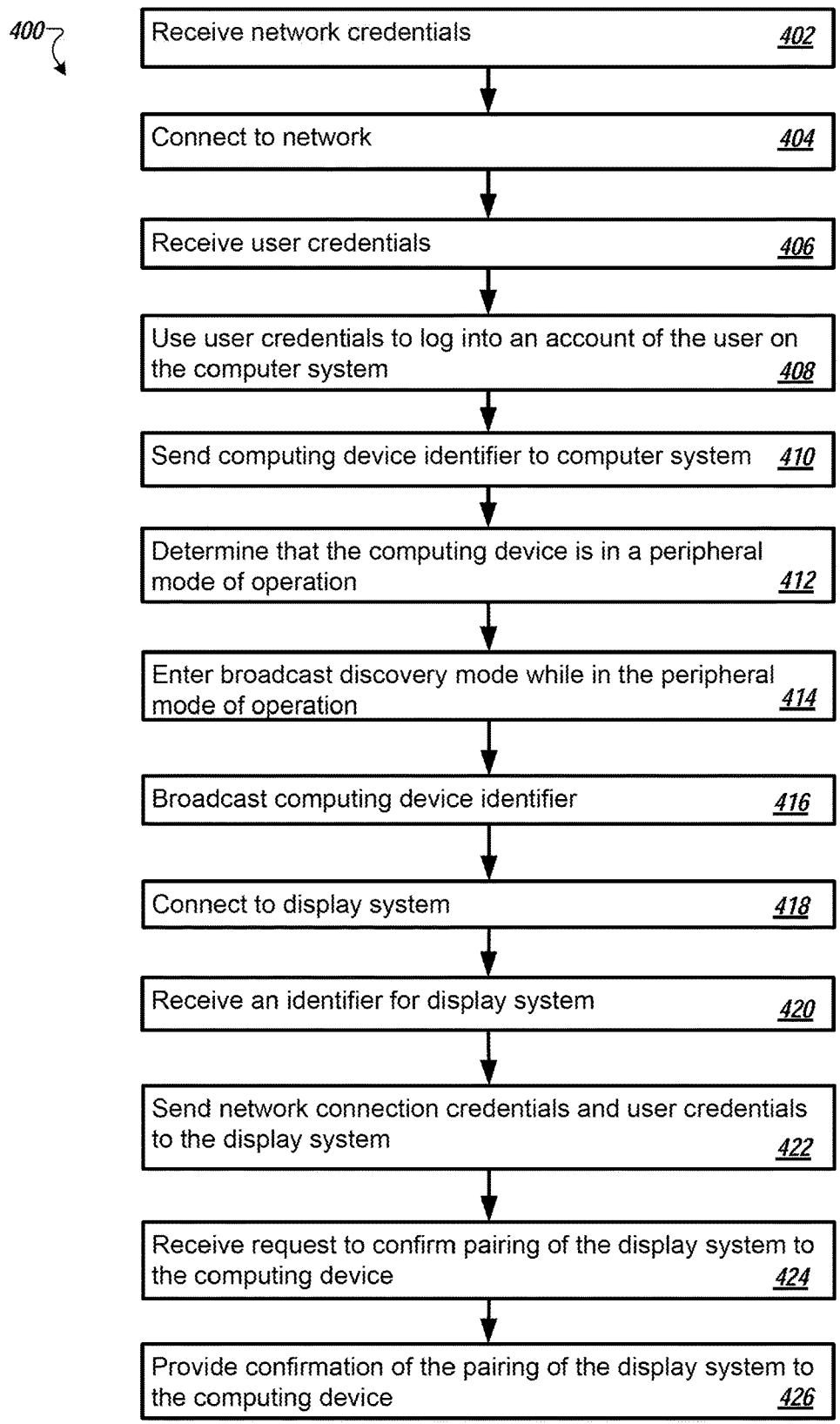
FIG. 4 is a flowchart that illustrates a method for interfacing with a computing device while in a peripheral mode of operation.

FIG. 4 is a flowchart that illustrates a method 400 for interfacing with a computing device while in a peripheral mode of operation. In some implementations, the systems, methods, and processes described herein can implement the method 400. For example, the method 400 can be described referring to FIGS. 1A-H, 2, and 3.

Network credentials are received (block 402). For example, a user interacting with the computing device 102 can provide network credentials needed to connect the computing device 102 to the network 110. In some cases, the user can interact with and provide the network credentials to the computing device 102 when the computing device 102 is in one of a laptop mode or tablet mode of operation. The user may interact with a graphical user interface (GUI) displayed in the display area 154 of the lid portion 150. In some cases, the computing device 102 may automatically connect (without user intervention) to the network 110 based on previously stored network credentials (e.g., network credentials stored in the memory 162).

Connect to a network (block 404). Using the received network credentials, the computing device 102 can connect to the network 110. By way of the network 110, the computing device 102 can then connect to the computer system 106.

User credentials are received (block 406). For example, the user of the computing device 102 can provide user credentials needed to log into an account of the user that can allow the user access to one or more services available for use by the user that may be hosted by or otherwise under the control of the computer system 106. The user can interact with and provide the credentials to the computing device 102 when the computing device is in one of a laptop mode or tablet mode of operation. For example, the user may interact with a GUI displayed in the display area 154 of the lid portion 150.

The received user credentials can be used to log into an account of the user on the computer system (block 408). Once logged into the account, access to one or more services can be granted to the user. The one or more services can include, but are not limited to, a movie subscription service, a calendar application, a webstore, an email application, a messaging application, a word processing application, a spreadsheet application, a presentation application, a web conferencing application, a streaming video application, etc. In some cases, the same user credentials can be used to access multiple services that may be hosted by a single service provider. In some cases, the user may provide different user credentials to different services that may be hosted by different service providers. For example, the user can log into an email account and read email messages. A user can log into a movie subscription service to watch a movie. In some implementations, each service may be provided on a different computer system each hosted by a different service provider. In some implementations, one or more services may be provided by a single service provider on a single computer system. In some implementations, one or more services may be provided by a single service provider on multiple computer systems.

An identifier associated with the computing device (e.g., a computing device identifier) is sent to the computer system (block 410). For example, an identifier associated with the computing device 102 is sent to the computer system 106 by way of the network 110. The computer system 106 can associate the login of the user to the user account with the computing device identifier. The computer system 106 can recognize that the user has logged into an account of the user using the computing device 102, accessing service(s) available to the user with the computing device 102 by way of the network 110.

It is determined that the computing device is in a peripheral mode of operation (block 412). Determining that the computing device is in a peripheral mode of operation can be based on an orientation of a lid portion (e.g., the lid portion 150) with respect to a base portion (e.g., the base portion 152). The orientation can allow access to one or more input devices (e.g., the input device(s) 141) included in an input area (e.g., the input area 140) included in the base portion (e.g., the base portion 152). As described herein, a user of a computing device (e.g., the computing device 102 as shown in FIGS. 1A-H, 2, and 3) can placed the computing device in a fully open position and place the computing device, for example, on a horizontal surface or a lap of the user with the lid portion (e.g., the lid portion 150) substantially making at contact with the surface or lap and the base portion (e.g., the base portion 152) facing upward. In this orientation and position, the user can interact with one or more input devices (e.g., the input device(s) 141) included in the computing device (e.g., the computing device 102) while the computing device is placed into the peripheral mode of operation. For example, the user, after interacting with the computing device 102 in a laptop mode of operation during business hours, decides, at the close of business, that they want to watch a movie on the display system 108. The user rotates the lid portion 150 of the computing device 102 to place the computing device in the fully open position. Once the fully open position is detected and the computing device 102 confirms (as described herein) that the peripheral mode of operation should be entered, the computing device is placed into the peripheral mode of operation.

Once in the confirmed peripheral mode of operation, the computing device enters a broadcast discovery mode (block 414). For example, the computing device (e.g., the computing device 102) can be capable of (configured to implement) peer-to-peer (P2P) communications. In addition or in the alternative, the computing device (e.g., the computing device 102) can be capable of (configured to implement) near-field communication (NFC).

The computing device can broadcast an identifier associated with the computing device (block 416). The computing device broadcasts the identifier in order to be picked up (found) by other computing devices capable of (configured to implement) P2P communications and/or NFC that are listening for other computing devices that are within a communication range. Other computing devices capable of P2P communications and/or NFC can pick up (hear or receive) the broadcasted identifier when the broadcasting computing device (e.g., the computing device 102) is within NFC with the other computing device (e.g., the display system 108).

For example, when the computing device 102 enters a peripheral mode of operation, the computing device 102 can also enable Bluetooth communication with other computing device(s) capable of (configured to implement) Bluetooth communication. The computing device 102 can then connect to other Bluetooth enabled devices that are within the range of Bluetooth communication (e.g., up to approximately 243 meters (approximately 800 feet) away from one another). In some implementations, the computing device identifier broadcasted can be the same as the computing device identifier sent to the computer system. In some implementations, the computing device identifier broadcasted can be different from the computing device identifier sent to the computer system.

In some implementations, once in the confirmed peripheral mode of operation, the computing device can enter a listening mode. In the listening mode, the computing device can listen for (pick up) an identifier associated with a broadcasting computing device capable of (configured to implement) P2P communications and/or NFC when the broadcasting computing device is within a communication range. The computing device (e.g., the computing device 102) can pick up the broadcasted identifier when the broadcasting computing device (e.g., the display system 108) is within NFC with the computing device. For example, when the computing device 102 enters a peripheral mode of operation, the computing device 102 can also enable Bluetooth communication with other computing device(s) capable of (configured to implement) Bluetooth communication. The computing device 102 can then connect to other Bluetooth enabled devices that are within the range of Bluetooth communication (e.g., up to approximately 243 meters (approximately 800 feet) away from one another).

The computing device connects to the display system (block 418). For example, the display system 108 listens for broadcasts from computing devices that are within a communication range of the display system 108. The display system 108 picks up the broadcasted identifier from the computing device 102 while the computing device 102 is in the peripheral mode of operation. For example, the display system 108 can display a GUI in the display area 112 of the display device 104. The GUI can display a code (e.g., a numerical code) or other type of identifier (or indicator) that the user can reenter into the GUI (or select in the GUI) using one or more of the input devices 141. The reentering can be a confirmation and acceptance of establishing a connection (NFC) between the computing device 102 in the peripheral mode of operation and the display system 108. In another example, the GUI can display an object, symbol, or icon that if selected by a user using one or more of the input devices 141 can confirm establishing the connection between the computing device 102 and the display system 108. Once confirmed, the display system 108 connects to the computing device 102, enabling NFC communication between the computing device 102 and the display system 108.

The computing device receives an identifier for the display system (block 420). For example, a unique identifier can be associated with the display system 108. The display system identifier can be provided by the display system 108 and received by the computing device 102. Referring to FIG. 1B, the computing device 102 can store the display system identifier in the memory 162.

The computing device sends network connection credentials and user credentials to the display system (block 422). The user credentials can be associated with the computing device. For example, the display system 108 uses the network credentials to connect to the network 110. In an example use of WiFi, the computing device 102 can provide (send) WiFi credentials to the display system 108. The display system 108 can use the WiFi credentials to connect to the network 110. In some implementations, the computing device 102 can provide (send) the display system 108 a path to the network 110. A network protocol (e.g., WiFi, Transmission Control Protocol/Internet Protocol (TCP/IP)) can act as a proxy to allow the display system 108, using the provided path, to connect to the network 110 using the network protocol. In an example use of WiFi, the WiFi can act as a proxy that can allow the display system 108 to connect to the network 110 using WiFi.

Once connected to the network 110, the display system 108 can send the received user credentials and the computing device identifier to the computer system 106. The display system 108 can also provide the computer system 106 with an identifier associated with the display system 108. The user credentials can be used to log into an account for the user and to gain access to one or more services hosted by the computer system 106. Before allowing the display system 108 to gain access to the account of the user, however, the computer system 106 can send a request to the computing device 102 for confirmation. The computer system 106 can communicate with the computing device 102 by way of the network 110. The computer system 106 can send a request to the computing device 102 to confirm that the computing device 102 has permitted a connection to (is paired with) the display system 108.

The request to confirm the pairing of (the connecting of) the display system to the computing device is received (block 424). For example, based on the previous login of the user to the account of the user using the computing device 102 (as described with reference to block 408 of the method 400) and based on the computer system 106 associating the login of the user to the user account with the computing device identifier (as described with reference to block 410 of the method 400), the computer system 106 can send the identifier associated with the display system 108 to the computing device 102 along with the request to confirm that the computing device 102 has paired with (connected to) the display system 108. Because the computing device 102 previously received the identifier associated with the display system 108 when the computing device 102 connected to (paired with) the display system 108, the computing device 102 can confirm that the identifier sent by the computer system 106 is the same as the identifier the computing device 102 received from the display system 108. Based on the matching of the identifiers, the computing device 102 can respond to the request sent by the computer system 106, confirming the connection to (pairing with) the display system 108. In some implementations, the confirmation is performed without the need for any user intervention. Stated another way, the confirmation can occur automatically.

Provide confirmation of the pairing of (the connecting of) the display system to the computing device (block 426). Once the confirmation is received, the display system 108 can log into the account of the user allowing the display system access to one or more services available for access by the user.

Figure 5:
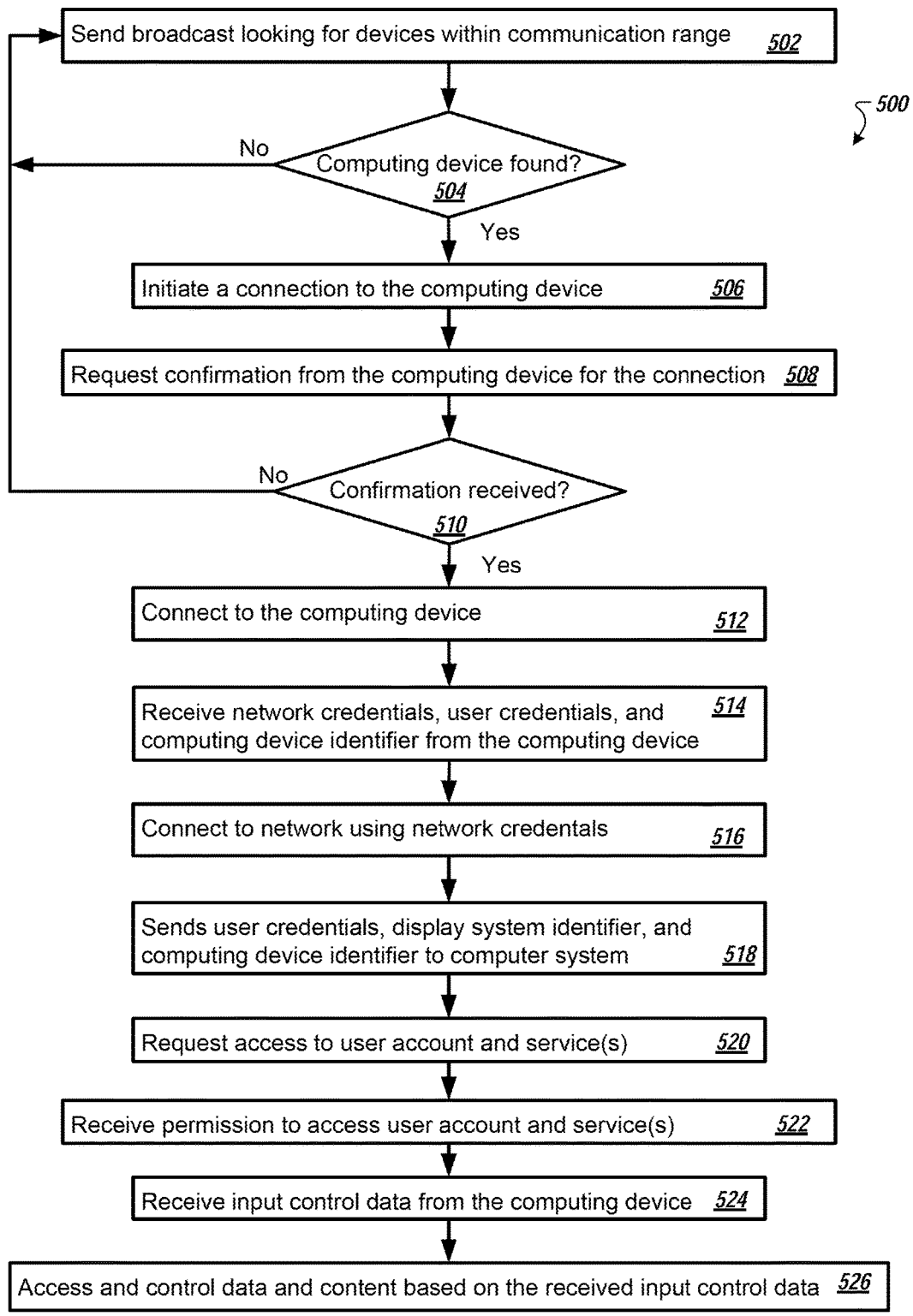
FIG. 5 is a flowchart that illustrates a method for interfacing with a display system.

FIG. 5 is a flowchart that illustrates a method 500 for interfacing with a display system. In some implementations, the systems, methods, and processes described herein can implement the method 400. For example, the method 500 can be described referring to FIGS. 1A-H, 2, and 3.

Listen for devices within a particular communication range (block 502). For example, the display system 108 can be listening for broadcasts from computing devices within a particular NFC distance from the display system 108. If a computing device is not found (block 504), continue to listen (block 502). If a computing device is found, initiate a connection to the computing device (block 506). For example, the computing device 102, when placed into a peripheral mode of operation, can enter a broadcast discovery mode. In the broadcast discovery mode, the display system 108, capable of NFC with the computing device 102, can hear the broadcast, receive an identifier for the computing device 102, and initiate a connection to the computing device 102.

The display system requests confirmation from the computing device for the connection (block 508). For example, the display system 108 can display a GUI in the display area 112 of the display device 104. The GUI can display a code (e.g., a numerical code) or other type of identifier (or indicator) that the user can reenter into the GUI (or select in the GUI) using one or more of the input devices 141 included in the computing device 102. The reentering can be a confirmation and acceptance of establishing a connection (NFC) between the computing device 102 in the peripheral mode of operation and the display system 108. In another example, the GUI can display an object, symbol, or icon that if selected by a user using one or more of the input devices 141 can confirm establishing the connection between the computing device 102 and the display system 108.

It is determined if confirmation for the connection is received (block 510). If the confirmation is not received (block 510), the method 500 continues to listen for devices within a communication range (block 502). If the confirmation is received (block 510), the display system connects to the computing device (block 512).

Network credentials, user credentials, and an identifier associated with the computing device are received (block 514). For example, the display system 108 receives the network credentials, the user credentials, and the computing device identifier from the computing device 102. In some implementations, the computing device identifier may be broadcasted by the computing device 102 when in a broadcast discovery mode. Once the display system 108 connects to (pairs with) the computing device 102, the display system 108 can store (e.g., in the memory 122) the computing device identifier.

A connection to the network is made using the network credentials (block 516). For example, the display system 108 connects to the network 110. Once connected to the network, the display system sends the user credentials, the display system identifier, and the computing device identifier to the computer system (block 518). A request to access the user account (and access service(s) available to the user) using the user credentials is sent to the computer system (block 520). For example, the display system 108 can send the user credentials, the identifier associated with the display system 108, the identifier associated with the computing device, and a request to log into an account of the user to the computer system 106 by way of the network 110.

The computer system 106 can communicate with the computing device 102 by way of the network, sending a request to the computing device 102 to confirm that the display system 108 is connected to (paired with) the computing device 102. The computer system 106 will allow the display system 108 to log into the account of the user using the provided user credentials and to access service(s) available to the user based on the computing device 102 providing a confirmation to the computer system 106 that the display system 108 and the computing device 102 are connected (paired). The computing device 102 confirms the pairing of (connecting of) the computing device 102 to the display system 108 to the computer system 106.

Permission to access the user account and the service(s) available to the user is received (block 522). For example, the computer system 106 by way of the network 110 provides a confirmation to the display system 108 that the display system 108 can access the service(s) available to the user.

Input control is received from the computing device (block 524). For example, a user can interact with the one or more input devices 141 included in the computing device 102 while the computing device is in the peripheral mode of operation (e.g., as shown, for example, in FIGS. 3 and 4). The display system 108 can receive input data from the computing device 102 representative of the output of the one or more input devices 141.

Data and content can be accessed and controlled based on the received input control data (block 526). For example, the display system 108 can receive keystroke information and data as a user types on the keyboard 142. The keystroke data can be translated into character entry in a GUI for a service or application running on (or being controlled by) the display system 108. In another example, the display system 108 can receive coordinate data and information as a user interacts with the pointer button, 146, the trackpad, and/or the mouse buttons 148*a*-*d*. The coordinate data and information can be translated into movement of a cursor in a GUI for a service or application running on (or being controlled by) the display system 108.

Referring to FIG. 1A, one or more of the applications 124 included in the control circuitry and software 130 can receive the keystroke information and data, and the coordinate data and information. The one or more of the applications 124 can translate the keystroke information and data, and the coordinate data and information into character entry in a GUI and/or movement of a cursor in a GUI, respectively, for a service or application running on (or being controlled by) the display system 108.

As described herein, a user can log into a user account using a computing device, then transitioning or placing the computing device into a peripheral mode of operation. Once placed into the peripheral mode of operation, the computing device broadcasts a NFC communication identifier. If a display system is listening for such broadcasts and is within the distance range for NFC, the display system can request connection to the computing device. The computing device can confirm the connection. Once connected to the display system, the computing device can send network credentials and user credentials to the display system. The display system can use the network credentials to connect to a network and can use the user credentials to log into an account for the user on a computer system on the network once the user confirms that the display system can do so. Once these connections are completed (the computing device is connected using NFC to the display system and the display system is connected to the computer system by way of a network), the computing device in a peripheral mode of operation can control the display system in order to access the service(s) available to a user of the computing device. The computing device can provide information and data from one or more input devices included in the computing device (and accessible in the peripheral mode of operation) in order to control the access of the services by the display system.

Because a user can use a computing device (e.g., the computing device 102 as shown herein) that they may already own to serve as an input device for a display system (e.g., the display system 108, the display system 208), the user does not have to purchase another separate device. In addition, because the computing device is capable of other functions besides just being used as an input device, information such as network credentials and user credentials that the computing device may be aware of can be provided to the display system without the need for the user to have to go through a separate setup process for the display system. The setup process for the display system can be nearly automatic, requiring little if any input (aside from confirmations) from the user.

Referring to FIG. 2 as a non-limiting example, the user can access an email application and view, compose, and respond to email messages using the one or more input devices 141 included in the computing device 102 while interacting with a GUI for the email application as displayed in the display area 212 of the display device 204. The computing device 102, in the peripheral mode of operation, can send control data and/or data from each of the input devices 141 to the display system 208 to control the information and data displayed in the GUI of the email application. For example, the computing device 102 can send keystroke data to the display system 208 as the user 210 types on the keyboard 142. The keystroke data can be entered into the email application and displayed in the GUI. For example, the computing device can send coordinate data and information as the user 210 interacts with the pointer button, 146, the trackpad, and/or the mouse buttons 148*a*-*d*. This data and information can be translated into movement of a cursor 218 in the GUI for the email application, highlighting and possibly selecting information displayed in the GUI of the email application.

Referring to FIG. 3 as a non-limiting example, the user can access a messaging application and view, compose, and send messages to friends and family using the one or more input devices 141 included in the computing device 102 while interacting with a GUI for the messaging application as displayed in the display area 312 of the display device 304. The computing device 102, in the peripheral mode of operation, can send control data and/or data from each of the input devices 141 to the display device 304 to control the information and data displayed in the GUI of the messaging application. For example, the computing device 102 can send keystroke data to the display device 304 as the user 210 types on the keyboard 142. The keystroke data can be entered into the messaging application and displayed in the GUI. For example, the computing device can send coordinate data and information as the user 210 interacts with the pointer button, 146, the trackpad, and/or the mouse buttons 148a-d. This data and information can be translated into movement of a cursor 318 in the GUI for the messaging application, highlighting and possibly selecting information displayed in the GUI of the messaging application.

Figure 6:
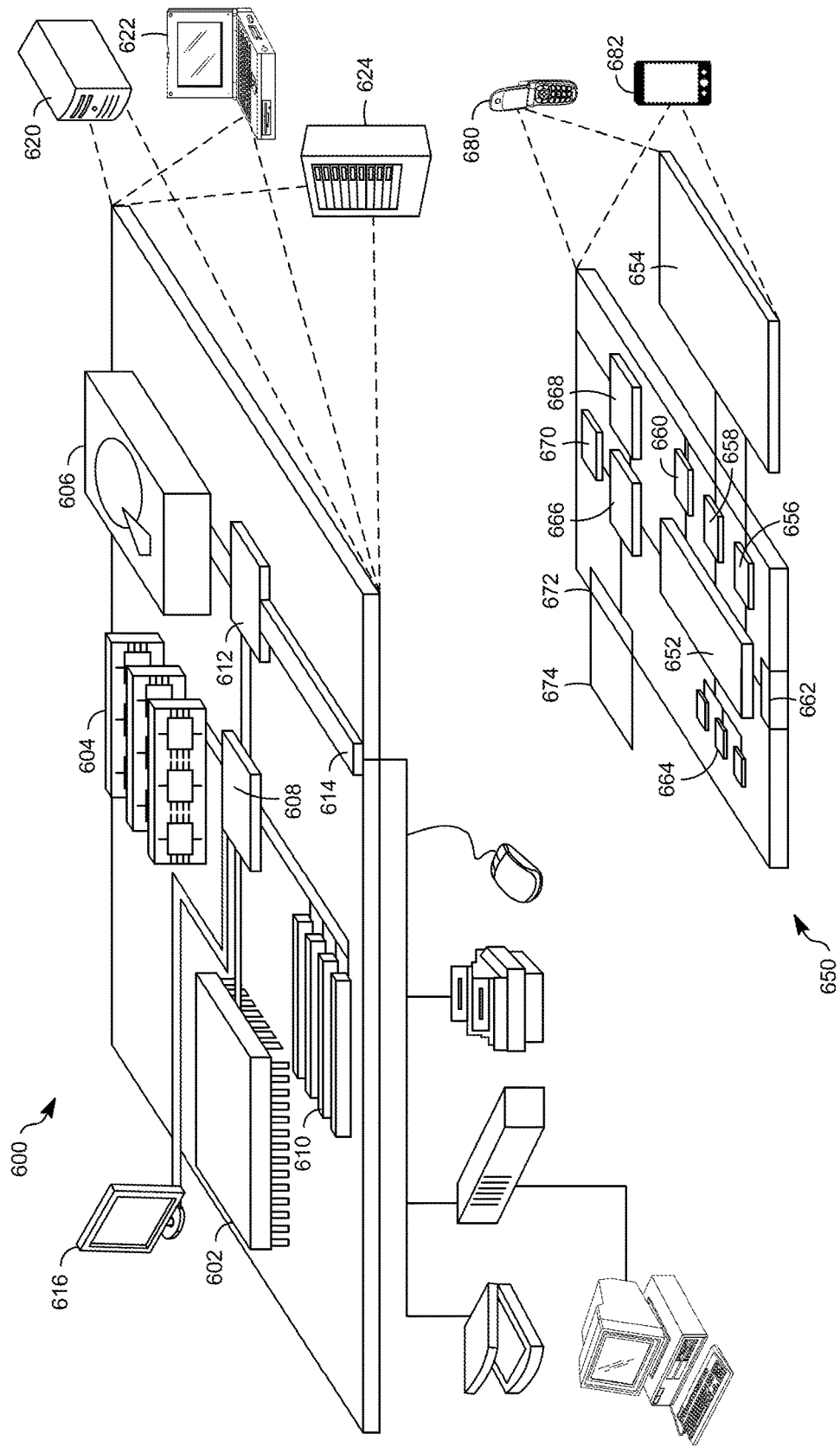
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semi-conductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The computing system can include clients and servers. A client and server are generally remote from each other and typically interact through a communication network. The relationship of client and server arises by virtue of computer programs running on the respective computers and having a client-server relationship to each other.

In situations in which the systems and methods discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A number of embodiments have been described. Nevertheless, it will be understood that various modifications may be made without departing from the spirit and scope of the specification. For example, each claim below and the examples of such claims described above can be combined in any combination to produce additional example embodiments.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
  determining, by a computing device including a lid portion and a base portion mechanically coupled to the lid portion, that the computing device is in a peripheral mode of operation in which the lid portion is positioned against a bottom portion of the base portion, with an upper portion of the base portion facing upward so as to allow access to one or more input devices included in an input area included in the upper portion of the base portion;
entering, by the computing device, a broadcast discovery mode in response to the determination that the computing device is in the peripheral mode of operation;
connecting the computing device to a display system that is listening for broadcasts from the computing device, the connecting enabling wireless communication between the computing device and the display system;
sending, from the computing device to the display system, network credentials and user credentials associated with the computing device;
receiving, by the computing device, from a computer system, a request to confirm the connection between the computing device and the display system; and
providing, by the computing device, to the computer system, confirmation of the connection between the computing device and the display system.

2. The method of claim 1, wherein determining that the computing device is in a peripheral mode of operation includes:
determining that the computing device is in a fully open position
in which the lid portion is positioned at a substantially 360 degree angle with respect to the base portion, with the input area of the base portion oriented in a first direction, and a display area of the lid portion oriented in a second direction that is opposite the first direction.

3. The method of claim 2, wherein connecting the computing device to the display system further includes:
receiving confirmation to allow the connecting of the computing device to the display system; and
providing the confirmation to the display system.

4. The method of claim 3, wherein receiving the confirmation to allow the connecting of the computing device to the display system includes entering, by a user of the computing device, an identifier into a graphical user interface displayed in a display area of a display device included in the display system, the entering including:
receiving data indicative of interactions with the one or more input devices included in the input area of the base portion; and
providing, by the computing device and to the display system, the received data indicative of interactions with the one or more input devices to the display system.

5. The method of claim 1, wherein the display system includes control circuitry and software configured to:
implement communication between the display system and the computing device in the peripheral mode of operation;
implement communication between the display system and a computer system by way of a network; and
process information and data received from the computing device.

6. The method of claim 5, wherein processing the information and data received from the computing device includes:
controlling content on the display system based on the information and data received from the computing device.

7. The method of claim 5, wherein the display system further includes a display device, and wherein the control circuitry and software is included in a dongle plugged into the display device.

8. The method of claim 1, further comprising:
establishing, based on the network credentials, a connection between the display system and a network; and
providing to the display system access to an account of a user based on the user credentials.

9. The method of claim 1, further comprising:
receiving, from the display system, an identifier for the display system;
wherein the request received from the computer system to confirm the connection between the computing device and the display system includes the display system identifier; and
wherein providing confirmation of the connection between the computing device and the display system includes determining that the display system identifier received from the computer system is the same as the display system identifier received from the display system.

10. A method comprising:
establishing, by a display system, a connection to a computing device based on determining that the computing device is in a peripheral mode of operation in which a lid portion is positioned against a bottom portion of a base portion of the computing device, such that one or more input devices included in an input area on an upper portion of the base portion are accessible, and based on receiving confirmation for the connection from the computing device;
receiving, by the display system from the computing device, network credentials and user credentials associated with the computing device;
establishing, by the display system, a connection to a network using the network credentials;
sending, by the display system and to a computer system by way of the network, the user credentials;
requesting approval for access to a user account using the user credentials;
accessing the user account, the accessing based on receiving approval to access to the user account;
accessing one or more services based on accessing the user account;
receiving, from the computing device, input control data; and
accessing, by the display system, content provided by the one or more services based on the received input control data, the content for use by the display system.

11. The method of claim 10, further comprising:
receiving, from the computing device, a computing device identifier associated with the computing device; and
wherein requesting approval for access to the user account using the user credentials includes sending the computing device identifier to the computer system for use in identifying the computing device.

12. The method of claim 11, wherein requesting approval for access to the user account using the user credentials further includes sending an identifier associated with the display system to the computer system for use by the computing device when determining the approval for the display system to access the user account.

13. The method of claim 10, wherein receiving confirmation for the connection from the computing device includes:
displaying, on a display device included in the display system, a graphical user interface (GUI) including a numerical code; and
receiving entry of the numerical code in the GUI.

14. A computing device comprising:
a lid portion including a display area;
a base portion mechanically coupled to the lid portion, the base portion including an input area on an upper portion of the base portion, the input area including at least one input device;
a processor configured to process instructions for execution within the computing device;
a memory configured to store an identifier associated with the computing device;
at least one sensor configured to sense a configuration of the computing device;
an operating mode manager configured to enter the computing device into a peripheral mode of operation in response to data received from the at least one sensor indicating that the computing device is in a fully open configuration in which the lid portion is positioned against a bottom portion of the base portion, with an upper portion of the base portion facing upward so as to allow access to the at least one input device included in the input area included in the base portion; and
at least one communication module configured to:
   initiate a broadcast discovery mode in response to a determination that the computing device is in the peripheral mode of operation;
   connect to a display system that is listening for broadcasts, the connecting enabling wireless communications between the computing device and the display system;
   send, to the display system, network credentials and user credentials associated with the computing device; and
   provide, to the display system, data for use in confirming the connection between the computing device and the display system.

15. The computing device of claim 14, wherein the operating mode manager is further configured to receive data indicative of an interaction with the at least one input device.

16. The computing device of claim 15, wherein the data indicative of the interaction with the at least one input device is used to confirm the connection between the computing device and the display system.

17. The computing device of claim 14, wherein entering the computing device into a peripheral mode of operation is further based on receiving data from the at least one sensor indicating that the lid portion is positioned at a substantially 360 degree angle with respect to the base portion of the computing device, with the input area of the base portion oriented in a first direction, and a display area of the lid portion oriented in a second direction that is opposite the first direction.

18. The computing device of claim 14,
wherein the display system uses the network credentials to connect to a network, and
wherein the display system uses the user credentials to access an account of a user.

19. The computing device of claim 18, wherein the at least one communication module is configured for Bluetooth communication and the other configuration module is configured for WiFi communication.

20. The computing device of claim 14, further comprising another communication module configured to receive, from a computer system, an identifier for the display system,
wherein the at least one communication module is further configured to receive, from the display system, the display system identifier, and
wherein providing data for use in confirming the connection between the computing device and the display system is based on determining that the display system identifier received from the computer system is the same as the display system identifier received from the display system.

* * * * *